US012623408B2

(12) United States Patent
McLeod et al.

(10) Patent No.: US 12,623,408 B2
(45) Date of Patent: May 12, 2026

(54) STEREOLITHOGRAPHY WITH MICRON SCALE CONTROL OF PROPERTIES

(71) Applicant: The Regents of the University of Colorado, a body corporate, Denver, CO (US)

(72) Inventors: Robert R. McLeod, Boulder, CO (US); Asais Camila Uzcategui, Denver, CO (US); John Elliott Hergert, Denver, CO (US); Archish Muralidharan, Denver, CO (US)

(73) Assignee: The Regents of the University of Colorado, a Body Corporate, Denver, CO (US)

( * ) Notice: Subject to any disclaimer, the term of this patent is extended or adjusted under 35 U.S.C. 154(b) by 914 days.

(21) Appl. No.: 17/149,423

(22) Filed: Jan. 14, 2021

(65) Prior Publication Data

US 2021/0229364 A1 Jul. 29, 2021

Related U.S. Application Data

(60) Provisional application No. 62/960,956, filed on Jan. 14, 2020.

(51) Int. Cl.
*B29C 64/393* (2017.01)
*B29C 64/124* (2017.01)
(Continued)

(52) U.S. Cl.
CPC .......... *B29C 64/393* (2017.08); *B29C 64/124* (2017.08); *B29C 64/264* (2017.08);
(Continued)

(58) Field of Classification Search
CPC ... B29C 64/393; B29C 64/264; B29C 64/124; B33Y 50/02; B33Y 70/00;
(Continued)

(56) References Cited

U.S. PATENT DOCUMENTS

| | | | | |
|---|---|---|---|---|
| 2016/0229222 | A1* | 8/2016 | Stecker | B29C 64/386 |
| 2018/0022034 | A1* | 1/2018 | Sutter | B29C 64/124 264/401 |
| 2022/0363010 | A1* | 11/2022 | Kostenko | B29C 64/286 |

OTHER PUBLICATIONS

Uzcategui et al. ("Understanding and Improving Mechanical Properties in 3D Printed Parts Using a Dual-Cure Acrylate-Based Resin for Stereolithography", Adv. Eng. Mater. 2018, 20, 1800876 (Year: 2018).*

(Continued)

*Primary Examiner* — Nahida Sultana
(74) *Attorney, Agent, or Firm* — Osha Bergman Watanabe & Burton LLP

(57) ABSTRACT

Stereolithography with micron scale control of properties is described herein. In one aspect, a computer-implemented method for 3-D printing of a material can include generating a functional relation predicting one or more physical properties of the material resulting from printing parameters; algebraically or numerically solving the functional relation to generate a second functional relation predicting expected printing parameters resulting in the one or more physical properties; and printing the material via a photopolymerization printer according to the set of printing parameters determined by the second functional relation.

12 Claims, 22 Drawing Sheets

(51) Int. Cl.
*B29C 64/264* (2017.01)
*B29K 23/00* (2006.01)
*B29K 105/00* (2006.01)
*B29K 105/24* (2006.01)
*B33Y 50/02* (2015.01)
*B33Y 70/00* (2020.01)

(52) U.S. Cl.
CPC ............... *B33Y 50/02* (2014.12); *B33Y 70/00* (2014.12); *B29K 2023/0691* (2013.01); *B29K 2105/0002* (2013.01); *B29K 2105/24* (2013.01); *B29K 2995/0094* (2013.01)

(58) Field of Classification Search
CPC .... B29K 2023/0691; B29K 2105/0002; B29K 2105/24; B29K 2995/0094
USPC .......................................................... 264/401
See application file for complete search history.

(56) References Cited

OTHER PUBLICATIONS

Langtangen et al., "Scaling of Differential Equations", SpringerOpen 2016 (Year: 2016).*
Vitale et al. ("Frontal conversion and uniformity in 3D printing by photopolymerisation"); Materials 2016, 9, 760; published Sep. 7, 2016 (Year: 2016).*
Choy et al., Functionally graded material by additive manufacturing, Proceedings of the 2nd International Conference on Progress in Additive Manufacturing (Pro-AM 2016), 206-211 (Year: 2016).*
Birman, et al., "Modeling and analysis of functionally graded materials and structures", American Society of Mechanical Engineers Digital Collection, 60, 2007, 195-216.
Canal, et al., "Correlation between mesh size and equilibrium degree of swelling of polymeric networks", J. Biomed. Mater. Res., 23, 1989, 1183-1193.
Cox, et al., "Tunable Mechanical Anisotropy, Crack Guiding, and Toughness Enhancement in Two-Stage Reactive Polymer Networks", Adv. Eng. Mater., 21:1900578, 2019.
Fiedler, et al., "Enhanced mechanical properties of photo-clickable thiol-ene PEG hydrogels through repeated photopolymerization of in-swollen macromer", Soft Matter, 12, 2016, 9095-9104.
Gojzewski, et al., "Layer-by-Layer Printing of Photopolymers in 3D: How Weak is the Interface?", ACS Appl. Mater. Interfaces, 12, 2020, 8908-8914.
Kuang, et al., "Grayscale digital light processing 3D printing for highly functionally graded materials", Sci. Adv., 5, 2019.
Muralidharan, et al., "Stereolithographic 3D Printing for Deterministic Control over Integration in Dual-Material Composites", Adv. Mater. Technol., 2019.
Uzcategui, et al., "Understanding and Improving Mechanical Properties in 3D printed Parts Using a Dual-Cure Acrylate-Based Resin for Stereolithography", Adv. Eng. Mater., 20, 2018.
Vitale, et al., "Frontal Conversion and Uniformity in 3D Printing by Photopolymerisation", Materials, 9, 2016, 760.
Yin, et al., "Orthogonal programming of heterogeneous micromechanoenvironments and geometries in three-dimensional biostereolithography", Nat. Commun., 9, 2018.
Zhao, et al., "Indentation experiments and simulations of nonuniformly photocrosslinked polymers in 3D printed structures", Addit. Manuf., 35:101420, 2020.

* cited by examiner

FIG. 5A
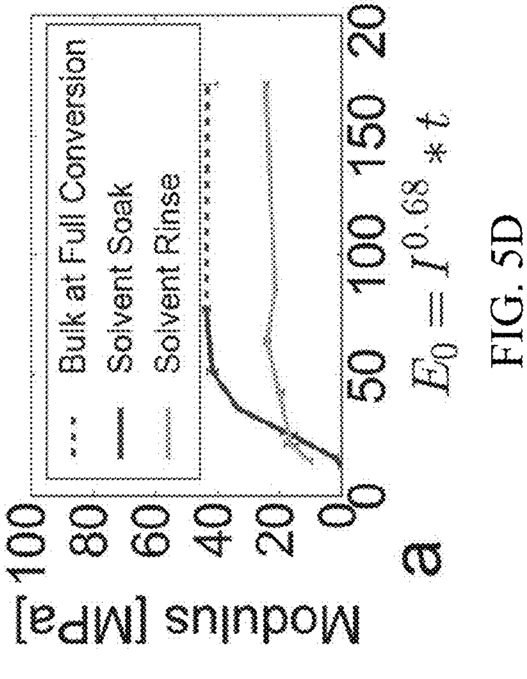
FIG. 5B
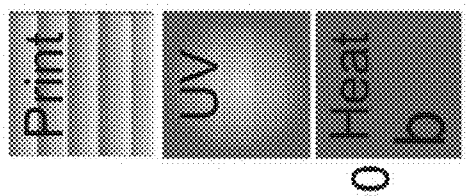
FIG. 5C
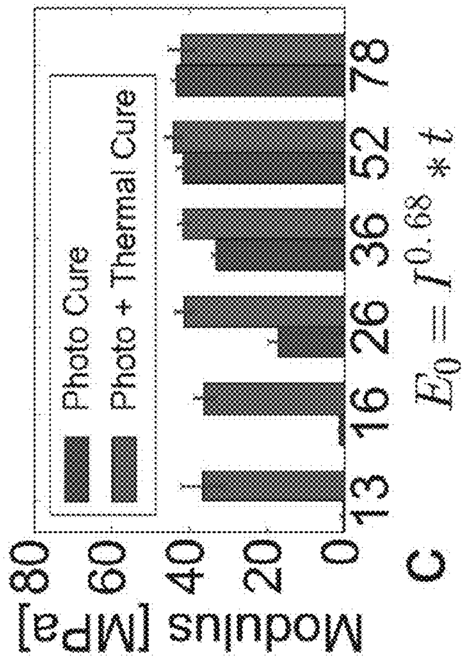
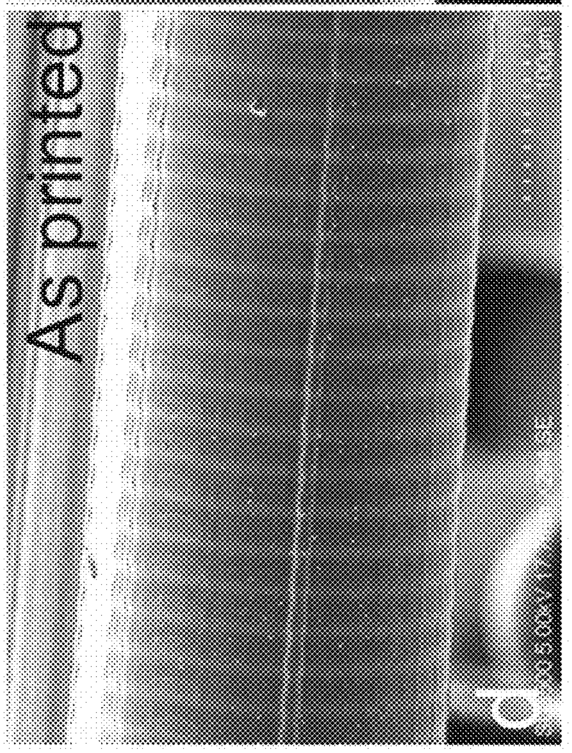
FIG. 5D
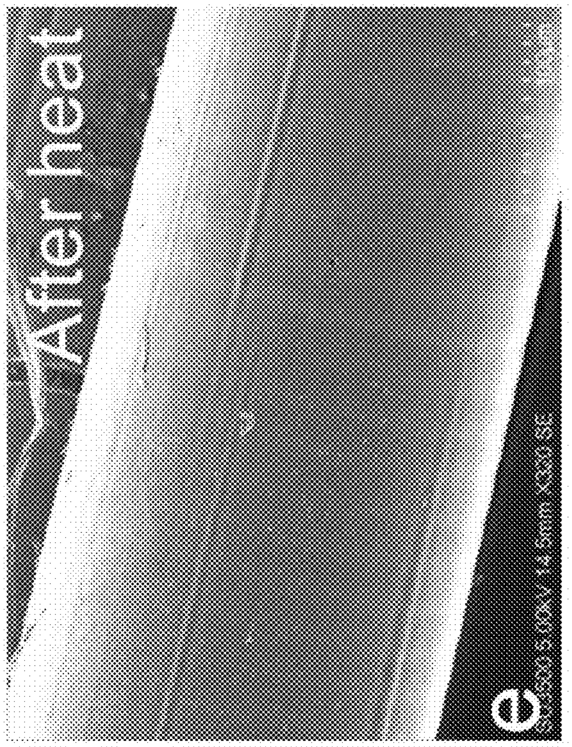
FIG. 5E

PETMP

TEGDVE

MDTO $Z_L$ = 10 μm

| | $I_0$ [mW/cm²] | $t_{exp}$ [s] | $E$ [mJ/cm²] | $E^*$ [(mW/cm²)^0.77 s] |
|---|---|---|---|---|
| A1 | 30 | 6 | 180 | 82 |
| A2 | 15 | 12 | 180 | 97 |

$Z_L$ = 30 μm

| | $I_0$ [mW/cm²] | $t_{exp}$ [s] | $E$ [mJ/cm²] | $E^*$ [(mW/cm²)^0.77 s] |
|---|---|---|---|---|
| B1 | 30 | 6 | 180 | 82 |
| B2 | 3 | 60 | 180 | 140 |

$Z_L = 100$ µm

| | $I_0$ [mW/cm²] | $t_{exp}$ [s] | $\varepsilon$ [mJ/cm²] | $\varepsilon^*$ [(mW/cm²)$^{0.77}$s] |
|---|---|---|---|---|
| C1 | 30 | 6 | 180 | 82 |
| C2 | 3 | 60 | 180 | 140 |

FIG. 18

| Sample | $I_o$ [mW cm$^{-2}$] All layers | $Z_{L1}$ [µm] 100 layers | $t_{exp1}$ [s] 100 layers | $Z_{L2}$ [µm] 1 layer | $t_{exp2}$ [s] 1 layer | $Z_{L3}$ [µm] 5 layers | $t_{exp3}$ [s] 5 layers | $Z_{L4}$ [µm] 100 layers | $t_{exp4}$ [s] 100 layers |
|---|---|---|---|---|---|---|---|---|---|
| **4A** | 30 | 10 | 0.6 | 146 | 6 | 1 | 6 | 10 | 0.6 |
| **4B** | 30 | 10 | 0.6 | 126 | 2.4 | 1 | 2.4 | 10 | 0.6 |
| **4C** | 30 | 10 | 0.6 | 126 | 1.2 | 1 | 1.2 | 10 | 0.6 |

STEREOLITHOGRAPHY WITH MICRON SCALE CONTROL OF PROPERTIES

CROSS-REFERENCE TO RELATED APPLICATIONS

This application claims priority under 35 U.S.C. § 119 (e) to U.S. Provisional Patent Application No. 62/960,956, filed Jan. 14, 2020, the contents of which is incorporated herein by reference in its entirety.

STATEMENT REGARDING FEDERALLY SPONSORED RESEARCH

This invention was made with government support under 1R01AR069060 and 1R21HD090696 awarded by the National Institutes of Health and under 1826454 awarded by the National Science Foundation. The government has certain rights in the invention.

BACKGROUND OF THE INVENTION 3D printing is transforming traditional processing methods for applications ranging from tissue engineering to optics. To fulfill its maximum potential, 3D printing requires a robust technique for producing structures with precise three-dimensional (x, y, and z) control of mechanical properties. Previous efforts to realize such spatial control of modulus within 3D printed parts have largely focused on low-resolution (mm to cm scale) multi-material processes and grayscale approaches that spatially vary the modulus in the x-y plane and energy dose-based (E)=$I_0$ $t_{exp}$) models that do not account for the resin's sub-linear response to irradiation intensity.

3D printing creates complex, highly customized architectures with applications in tissue engineering, soft robotics, optics and metamaterials. Today, the elastic moduli of materials used for 3D printing vary from 10 s of kPa in polymers to 100 s of GPa in metals. However, the material properties resulting from most 3D printing methods are limited to a single property value or multiple discrete property values with limited control of spatial gradients. One of the pitfalls in the adoption of 3D printing for operational part fabrication is the lack of mechanical performance and the susceptibility of the structures to fail as compared to traditionally-manufactured analogues.

There is a need in the art for precise control of the mechanical, electrical, and/or biological properties of a 3D printed material. The present disclosure addresses this unmet need.

BRIEF SUMMARY

Stereolithography with micron scale control of properties is described herein. In one aspect, a computer-implemented method for 3-D printing of a material can include generating a functional relation predicting one or more physical properties of the material resulting from printing parameters; algebraically or numerically solving the functional relation to generate a second functional relation predicting expected printing parameters resulting in the one or more physical properties; and printing the material via a photopolymerization printer according to the set of printing parameters determined by the second functional relation.

This aspect can include a variety of embodiments. In certain embodiments, the printing is further implemented according to a printing pattern on the micronscale. In some cases, the printing pattern includes a smooth gradation in modulus of 30 MPa change over 75 μm, a step change in modulus of 30 MPa change over 5 μm, and/or both.

In other embodiments, the generating the functional relation includes measuring or calculating a physical property of the material as a function of exposure time, post-exposure time, and light intensity; identifying an equation to model the measurements or calculations which include a number of unknown parameters; and fitting the measurements or calculations to the model to estimate values of the unknown parameters.

In some cases, the equation for characterizing the material property can include $$C_p = \frac{x^3 + ax + b}{x^3 + cx + d},$$

where a, b, c, and d are fitting parameters, and x is a variable of scaled light intensity, time, and effective exposure.

In other embodiments, the one or more physical properties of the material includes at least one of a monomer-to-polymer conversion, a cross link density, a swellability, a Young's modulus, a diffusivity coefficient, a shear modulus, a stiffness factor, a viscoelasticity factor, a coefficient of friction, or a combination thereof.

In other embodiments, the set of printing parameters includes at least one of a layer thickness, an energy dose, an exposure time, an optical intensity, a cure depth, or a combination thereof.

In other embodiments, the polymerization printer comprises a stereolithography (SLA) printer or a digital light processing (DLP) printer.

In other embodiments, the printing the material comprises printing multiple layers of the material.

In other embodiments, the printing the material results in a functionally graded material (FGM).

Another aspect of the present disclosure includes a composition produced by the steps of printing a plurality of layers of a 3-D printed material via a photopolymerization printer according to a gradient design on the micronscale. Another aspect of the present disclosure is a photopolymerized 3-D printed material comprising a preselected gradient design on the micronscale.

These aspects can include a variety of embodiments. In certain embodiments, the gradient design comprises at least one of a monomer-to-polymer conversion, a cross link density, a swellability, a Young's modulus, a diffusivity coefficient, a stiffness factor, a viscoelasticity factor, a coefficient of friction, or a combination thereof.

In other embodiments, the composition includes a monomer having a crosslinkable group. In some cases, the monomer includes at least one of a thiol, hydroxyl, vinyl, urethane, isocyanate, acrylate, and/or methacrylate crosslinkable group.

In other embodiments, the monomer includes polyethylene glycol (PEG) that is endcapped with at least one of a thiol, hydroxyl, vinyl, urethane, isocyanate, acrylate, a methacrylate crosslinkable group, or a combination thereof.

In other embodiments, the composition can include one or more photoabsorbers. In other embodiments, the one or more photoabsorbers comprise at least one of 1-phenylazo-2-naphthol (sudan I), 1-(2,4-dimethylphenylazo)-2-naphthol (sudan II), 1-(4-(phenyldiazenyl)phenyl) azonaphthalen-2-ol (sudan III), 1-[{2-methyl-4-[(2-methylphenyl)diazenyl]

phenyl}diazenyl]naphthalen-2-ol (sudan IV), 2,5-bis(5-tert-butyl-benzoxazol-2-yl)thiophene, fluorescein, poly(3-hexylthiophene-2,5-diyl), oligothiophenes, triphenylamines, diketopyrrolopyrroles derivatives, 2,5-dihydro-3,6-di-2-thienyl-pyrrolo [3,4-c]pyrrole-1,4-dione, borondipyrromethenes derivatives, 1,3,5,7-tetramethyl-8-phenyl-4,4-difluoroboradiazaindacene, 2,2'-(2,5-thiophenediyl)bis(5-tert-butylbenzoxazole), (±)-α-tocopherol, 2-phenyl-2H-benzotriazole derivatives, indigo dye, 2,2-dimethyl-1,3-dihydroperimidin-6-yl)-(4-phenylazo-1-naphthyl)diazene (sudan black B), 1-(2-methoxyphenylazo)-2-naphthol (sudan red G), 2,5-bis(5-tert-butyl-benzoxazol-2-yl)thiophene, 4-methoxyphenol, butylated hydroxytoluene, 2-hydroxyphenyl-s-triazine, 2-(2H-benzotriazol-2-yl) phenol, or a combination thereof.

In other embodiments, the gradient design includes a smooth gradation in modulus of 30 MPa change over 75 μm, a step change in modulus of 30 MPa change over 5 μm, or both.

In other embodiments, the composition includes a FGM.

In another aspect, a non-transitory, computer-readable medium including instructions by a processor for printing material, where the instructions include: generate a functional relation predicting one or more physical properties of the material resulting from printing parameters; algebraically or numerically solve the functional relation to generate a second functional relation predicting expected printing parameters resulting in the one or more physical properties; and print the material via a photopolymerization printer according to the set of printing parameters determined by the second functional relation.

BRIEF DESCRIPTION OF THE DRAWINGS

The following detailed description of exemplary embodiments of the invention will be better understood when read in conjunction with the appended drawings. For the purpose of illustrating the invention, non-limiting embodiments are shown in the drawings. It should be understood, however, that the invention is not limited to the precise arrangements and instrumentalities of the embodiments shown in the drawings.

FIGS. 5A-5E illustrate a post-processing model applied to PEGDA. Panel a) depicts a short or lengthy wash leaves a plasticized or shrunken part, respectively. Panel b) depicts partial conversion vs. layer depth of a printed part is not removed by UV post-cure, but is by heat. Panel c) depicts the treatment restoring modulus and conversion as revealed in the swelling profiles of SLA columns soaked in ethanol without (Panel (d)) and with (Panel (e)) heat treatment.

FIG. 6A illustrates the dose distribution throughout the depth in discrete SLA where a gradient of dose is observed in every layer. FIG. 6B illustrates the dose distribution throughout the depth in continuous SLA where a gradient of dose is only observed in regions where intensity is changed.

FIG. 11A depicts the modulus as a function of depth, showing three regions of programmed stiffness. A step function from 26 MPa to 50 MPa, and a 150 μm continuous gradient to 26 MPa. FIG. 11B depicts three regions of programmed stiffness with a step function from 28 MPa to 60 MPa and a 100 μm continuous gradient to 28 MPa. FIG. 11C depicts four regions of programmed stiffness with a step function from 26 MPa to 35 MPa, a 75 μm continuous gradient to 6 MPa and a 75 μm continuous gradient to 26 MPa

FIG. 13A depicts a map of $Y_{AFM}$ for a structure 3D printed with $Z_L$=10 μm, where the intensity and time was varied to probe the effect of a sub-linear intensity scaling. Lower intensity and longer time (red) leads to both a higher mean modulus and a steeper positive through-thickness gradient. FIG. 13B depicts a map of $Y_{AFM}$ for a structure printed with $Z_L$=30 μm, showing a similar steepening of the positive gradient (orange) to A. FIG. 13C depicts a map of $Y_{AFM}$ for $Z_L$=100 μm, where the gradient is reversed and becomes steeper in the negative direction as the intensity is lowered and the time is increased. The graphs depict the line profiles (light color) and mean (dark color) of the AFM elastic modulus through the thickness. Spikes in the data are attributed to contaminants and sample preparation artifacts.

FIG. 18 depicts the exposure conditions used to fabricate parts in FIGS. 11A-11C.

DETAILED DESCRIPTION OF THE DISCLOSURE

Figure 1:
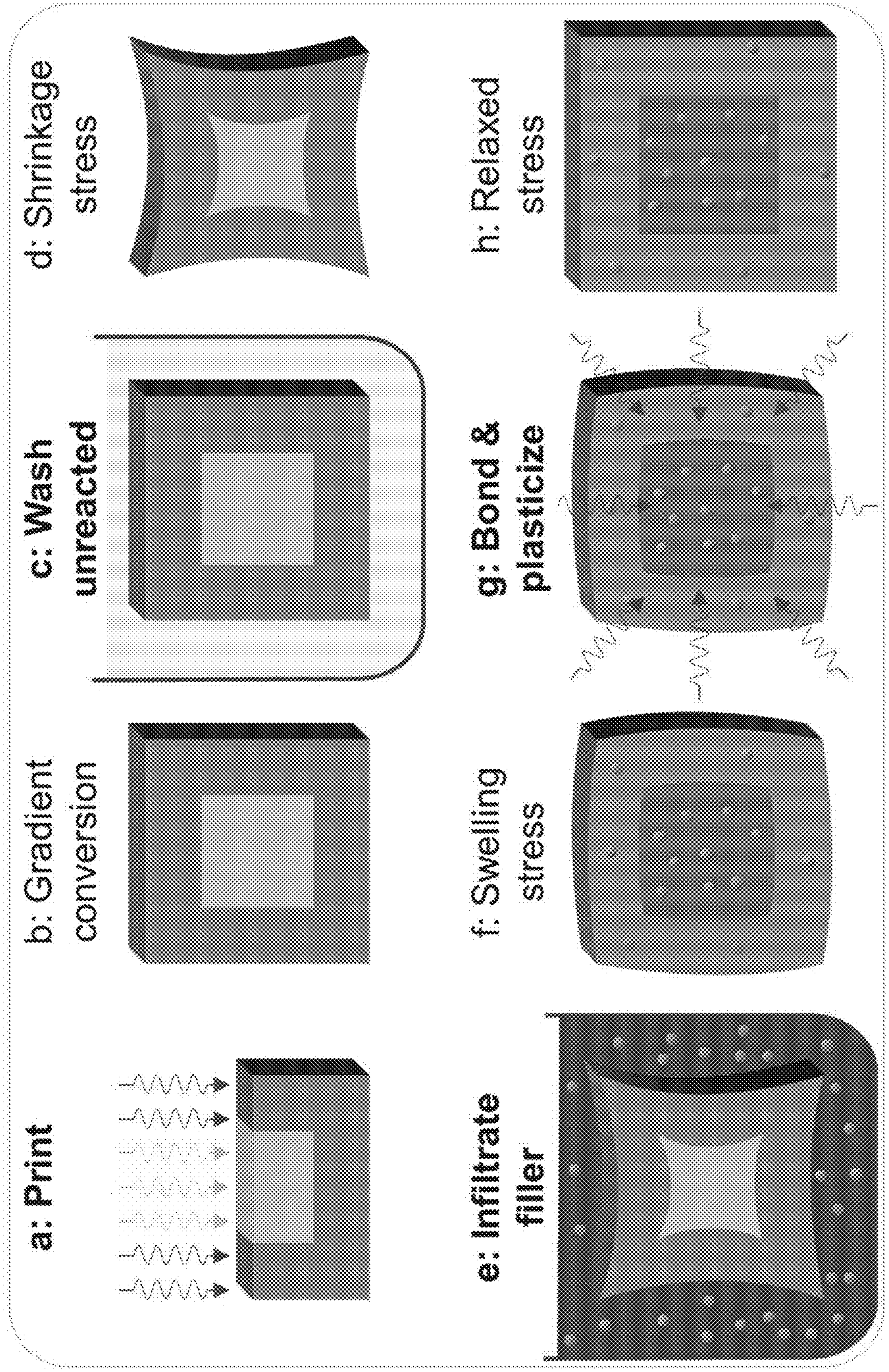
FIG. 1 illustrates a series of steps for 3D printing that may be used in accordance with various embodiments of the present technology.

In one aspect, the present disclosure relates to monomers comprising crosslinkable groups for use in stereolithography. In some embodiments, the monomer is a component of a stereolithography composition comprising at least one of an initiator, a photoabsorber, an additive that affects the mechanical, electrical, and/or biological properties of a resulting composite material made from the composition, and combinations thereof.

In another aspect, the present disclosure relates to a method of making a 3D printed material with precise control over the properties of the material. In some embodiments, the precise control is at the micron scale. In some embodiments, the mechanical, electrical, and/or biological properties of the material are controlled at the micron scale. In some embodiments, the properties of the resulting material can be tuned by controlling the time during which the monomer is irradiated. In certain embodiments, the properties of the resulting material can be tuned by controlling the intensity of light used to irradiate the monomer. In certain embodiments, the properties of the resulting material can be tuned by changing the thickness of the printed layer that is to be irradiated. In some embodiments, controlling the irradiation time, irradiation intensity, and/or layer thickness permits control of the mechanical, electrical, and/or biological properties of the resulting 3D printed material. In certain embodiments, the mechanical, electrical, and/or biological properties vary in a controlled manner throughout the resulting 3D printed material. In some embodiments, controlling the irradiation time, irradiation intensity, and/or layer thickness leads to control of the crosslink density of the resulting material. In certain embodiments, controlled changes in crosslink density lead to the properties of the resulting material. In certain embodiments, the mechanical, electrical, and/or biological properties of the 3D printed material are controlled by additives present in the stereolithography composition. In some embodiments, the method comprises a partial light-controlled conversion of monomer in the stereolithography composition to polymer in the 3D printed material. The 3D printed material can then be immersed in a solution of filler species, wherein areas of low conversion swell more than areas of high conversion, resulting in 3D gradient composites.

In yet another aspect, the present invention relates to a composite wherein the mechanical, electrical, and/or biological properties are controlled. In some embodiments, the properties are controlled on the micron scale. In some embodiments, the composite comprises a layered composite wherein the properties of each layer are individually controlled.

Definitions

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, selected methods and materials are described.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B."

"About" as used herein when referring to a measurable value such as an amount, a temporal duration, and the like, is meant to encompass variations of ±20% or ±10%, in certain embodiments ±5%, in certain embodiments ±1%, in certain embodiments ±0.1% from the specified value, as such variations are appropriate to perform the disclosed methods.

Ranges: throughout this disclosure, various aspects of the disclosure can be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Compounds and Compositions

In one aspect, the present disclosure relates to monomers comprising a crosslinkable group. The monomer can be any monomer known to a person of skill in the art for use in stereolithography or photopolymerization. In certain embodiments, the monomer comprises at least one of a thiol, hydroxyl, vinyl, urethane, isocyanate, acrylate, and/or methacrylate crosslinkable group. In certain embodiments, the monomer comprises polyethylene glycol (PEG) that is end-capped with at least one of a thiol, hydroxyl, vinyl, urethane, isocyanate, acrylate, and/or methacrylate crosslinkable group. In some embodiments, the monomer is a monomer of formula (I):

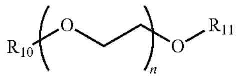

wherein $R_{10}$ and $R_{11}$ are each independently selected from $—CH{=}CH_2$, $—C({=}O)\ CH—CH_2$, and $—C({=}O)\ CCH_3—CH_2$; and n is an integer from 1-12.

In certain embodiments, the monomer of formula (I) is selected from

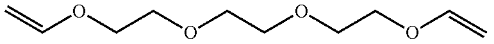

and

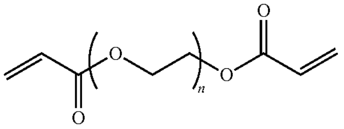

, wherein n is an integer from 1-12.

In some embodiments, the monomer is pentaerythritoltetra(3-mercaptopropionate) (PETMP), 2-methylene-propane-1,3-di(thioethyl vinyl ether) (MDTVE), and/or 2-methylpropane-1,3-di(thioethyl vinyl ether (MeDTVE). In certain embodiments, the monomer comprising a crosslinkable group comprises a combination of a monomer of formula (I) and PETMP. In some embodiments, the monomer comprising a crosslinkable group comprises a combination of

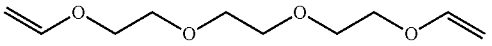

or

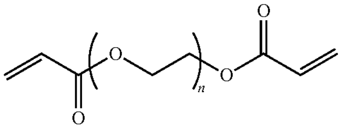

, wherein n is an integer from 1-12, and PETMP. In other embodiments, the monomer comprising a crosslinkable group comprises a combination of MeDTVE and PETMP. In yet another embodiment, the monomer comprising a crosslinkable group comprises a combination of MDTVE and PETMP. In some embodiments, the monomer comprising a crosslinkable group does not homopolymerize. In other embodiments, the monomer comprises a crosslinkable groups homopolymerizes.

In some cases, the monomer can include at least one of Poly(ethylene glycol) diacrylate (PEGDA, MW=700 Da), various MW PEG chains, butanediol diacrylate (BDDA), decylamine, isobutylamine, benzylamine, 2,4-Dimethoxybenzylamine, diphenyl(2,4,6-trimethylbenzoyl) phosphine oxide (TPO), Benzhydrazide and phenylacetic hydrazide, Divinyl sulfone (97%, contains ≤500 ppm hydroquinone as inhibitor), 1,6-hexanediol diacrylate (99% reactive esters with 90 ppm hydroquinone), valeric acid hydrazide (95%), mandelic acid hydrazide (97%), 4-hydroxybutyric hydrazide (98%), benzhydrazide (98%), ethyl carbazate (97%), and hexyl acrylate (95%). acethydrazide (95+%) and p-toluenesulfonyl hydrazide (97%), 9-fluorenylmethyl carbazate (>98%), and hexylamine (>99%), 4-aminobenzhydrazide (95%), 2-furoic hydrazide (98%), ethyl vinyl sulfone (98%), and diethyl maleate (97%), tert-butyl carbazate (99%) and benzyl carbazate (97%), 4-hydroxybenzhydrazide (≥98%), nicotinic hydrazide (97%).

In some aspects, the present disclosure relates to a composition comprising one or more monomers comprising a crosslinkable group. Exemplary monomers comprising a crosslinkable group are described elsewhere herein.

In certain embodiments, the composition further comprises one or more photoinitators. The photoinitiator can be any photoinitiator known to a person of skill in the art. Exemplary photoiniators include, but are not limited to, acetophenone, benzophenone, 2-phenylacetophenone, 2,2-dimethoxy-2-phenylacetophenone, dis (2,4,6-trimethylbenzoyl)-phenylphosphineoxide, 2-hydroxy-4'-(2-hydroxyethoxy)-2-methylpropiophenone, 2-methyl-(4-methylthienyl)-2-morpholinyl-1-propan-1-one, diphenyl(2,4,6-trimethylbenzoyl) phosphine oxide (TPO), ethyl(2,4,6-trimethylbenzoyl)phenyl phosphinate, lithium phenyl-2,4,6-trimethylbenzoylphosphinate, 2-methyl-7-methylene-1,5-dithiacyclooctane (MDTO), lithium phenyl-2,4,6-trimethylbenzoylphosphinate (LAP),

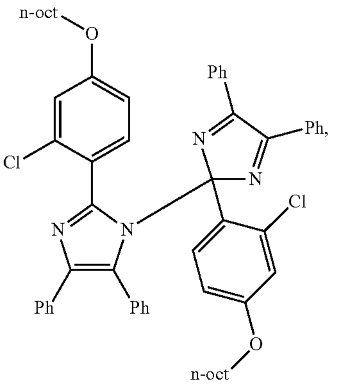

and

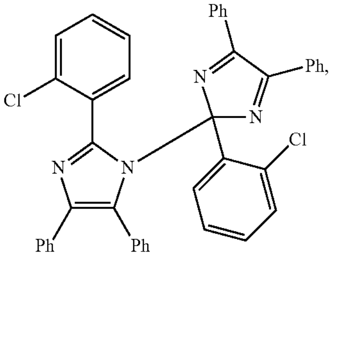

and combinations thereof. In certain embodiments, the photoinitator is TPO. In other embodiments, the photoinitiator is MDTO. In yet another embodiment, the photoinitiator is LAP.

In certain embodiments, the composition further comprises one or more thermal initators. The thermal initiator can be any thermal initiator known to a person of skill in the art. Exemplary thermal initiators include, but are not limited to, tert-amyl peroxybenzoate, 4,4-azobis(4-cyanovaleric acid), 1,1'-azobis(cyclohexanecarbonitrile), 2,2'-azobisisobutyronitrile (AIBN), benzoyl peroxide, 2,2-bis(tert-butylperoxy) butane, 1,1-bis(tert-butylperoxy)cyclohexane, 2,5-bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, peracetic acid, potassium persulfate, and combinations thereof.

In certain embodiments, the composition further comprises one or more photoabsorbers. The photoabsorber can be any photoabsorber known to a person of skill in the art. Exemplary photoabsorbers include, 1-phenylazo-2-naphthol (sudan I), 1-(2,4-dimethylphenylazo)-2-naphthol (sudan II), 1-(4-(phenyldiazenyl)phenyl) azonaphthalen-2-ol (sudan III), 1-[{2-methyl-4-[(2-methylphenyl)diazenyl] phenyl}diazenyl]naphthalen-2-ol (sudan IV), 2,5-bis(5-tert-butyl-benzoxazol-2-yl)thiophene, fluorescein, poly(3-hexylthiophene-2,5-diyl), oligothiophenes, tri-phenylamines, diketopyrrolopyrroles derivatives, 2,5-dihydro-3,6-di-2-thienyl-pyrrolo [3,4-c]pyrrole-1,4-dione, borondipyrromethenes derivatives, 1,3,5,7-tetramethyl-8-phenyl-4,4-difluoroboradiazaindacene, 2,2'-(2,5-thiophenediyl)bis(5-tert-butylbenzoxazole), (±)-α-tocopherol, 2-phenyl-2H-benzotriazole derivatives, indigo dye, 2,2-dimethyl-1,3-dihydroperimidin-6-yl)-(4-phenylazo-1-naphthyl)diazene (sudan black B), 1-(2-methoxyphenylazo)-2-naphthol (sudan red G), 2,5-bis(5-tert-butyl-benzoxazol-2-yl)thiophene, 4-methoxyphenol, butylated hydroxytoluene, 2-hydroxyphenyl-s-triazine, 2-(2H-benzotriazol-2-yl) phenol, and combinations thereof. In certain embodiments, the photoabsorber is 2-(2H-benzotriazol-2-yl) phenol.

In certain embodiments, the composition further comprises one or more additives that affect the mechanical, electrical, and/or biological properties of a resulting composite material made from the composition. Exemplary additives which affect the mechanical properties include, but are not limited to, monomers for secondary polymerization or polymers, solvents, and structural nanocomposites. In some embodiments, the monomers form glassy networks, such as acrylamide. In some embodiments, the nanocomposites are carbon or cellulose. Exemplary additives which affect the electrical properties include, but are not limited to, conductive polymers, silica nanoparticles, metal nanoparticles, and carbon nanotubes. In some embodiments, the metal nanoparticles are gold nanoparticles. Exemplary additives which affect the biological properties include, but are not limited to, metal nanoparticles, growth factors, proteins, and cells. In some embodiments, the metal nanoparticles are gold nanoparticles. In some embodiments, the growth factor is thiolated TGFb. In some cases, the photoabsorber can also include Quinoline Yellow and food dyes. In some cases, the photoinitiator can include riboflavin.

Methods

In certain embodiments, a computer-implemented method for 3-dimensional printing of a material can include generating a functional relation predicting one or more physical properties of the material resulting from printing parameters; algebraically or numerically solving the functional relation to generate a second functional relation predicting expected printing parameters resulting in the one or more physical properties; and printing the material via a photopolymerization printer according to the set of printing parameters determined by the second functional relation.

In some embodiments, generating the functional relation further includes: measuring or calculating a physical property of the material as a function of exposure time, post-exposure time, and light intensity; identifying an equation to model the measurements or calculations which a number of unknown parameters; and fitting the measurements or calculations to the model to estimate values of the unknown parameters. In some cases, the model includes a scaled model, for example, a model scaled to light intensities.

In some cases, the one or more physical properties of the material includes at least one of a monomer-to-polymer conversion, a cross link density, a swellability, a Young's modulus, a diffusivity coefficient, a shear modulus, a stiffness factor, a viscoelasticity factor, a coefficient of friction, or a combination thereof.

In some cases, the set of printing parameters includes at least one of a layer thickness, an energy dose, an optical intensity, an exposure time, a cure depth, or a combination thereof.

In some embodiments, the polymerization printer comprises a stereolithography (SLA) printer or a digital light processing (DLP) printer.

In some embodiments, the printing the material includes printing multiple layers of the material. In some cases, the material originates from a single vat of precursor solution or resin of the printer. In some cases, the printing of the material results in a functionally graded material.

In some embodiments, continuous platform motion, gradient exposure intensity, and/or predictive process modelling can be used to enable control over conversion with the same resolution at which current SLA controls shape.

In some embodiments, the method further comprises the step of immersing the printed material in a solution of filler species dissolved in solvent. Although not wishing to be limited by theory, it is believed that immersing the printed material in the solution of filler species results in low conversion regions (e.g. regions which received a lower intensity light or were illuminated with light for a shorter period of time) swelling significantly more than areas of the printed material that received a higher intensity of light or a longer illumination time.

In certain embodiments, the solution of filler species comprises a monomer comprising a crosslinkable group. Exemplary monomers comprising a crosslinkable group are described elsewhere herein. In some embodiments, the printed material comprises excess crosslinkable groups that have not polymerized during printing. In some embodiments wherein the printed material comprises excess crosslinkable groups, a solution of filler species comprising a monomer with a crosslinkable group will react and crosslink with the excess crosslinkable groups in the printed material. In some embodiments, the heat or light is applied to generate radicals and the monomer with a crosslinkable group in the solution of filler species crosslinks with the printed material comprising excess crosslinkable groups. In certain embodiments, this post processing crosslinking of excess crosslinkable groups in the printed material with a filler monomer comprising crosslinkable groups leads to an increase in the modulus of the printed material. In some embodiments, the modulus of the material is increased over 100-fold.

In certain embodiments, the solution of filler species comprises one or more additives which are used to control the properties of the 3D printed material. In certain embodiments, the additive controls the electrical and/or conductivity properties of the 3D printed material. In some embodiments, the additive to control the electrical and/or conductivity properties is a silica nanoparticle, a metal nanoparticle, a carbon nanotube, and/or a conductive polymer. In certain embodiments, the metal nanoparticle is a gold nanoparticle. In some embodiments, the solution of filler species comprises one or more additives which are used to control the biological properties of the 3D printed material. In certain embodiments, the additive to control the biological properties is a growth factor, a metal nanoparticle, and/or a cell. In certain embodiments, the metal nanoparticle is a gold nanoparticle. In certain embodiments, the growth factor is thiolated TGFb. In certain embodiments, the solution of filler species comprises a optical nanomaterial such as a quantum dot.

In some embodiments wherein the method comprises the step of immersing the printed material in a solution of filler species dissolved in solvent, the method further comprises the step of promoting a chemical bonding reaction. In certain embodiments, the printed material, which is swollen in solvent and filler, is baked, exposed to light, and/or exposed to a species that promotes a chemical bonding reaction. This initiates covalent bonding of the filler to the printed material and/or the filler itself, may complete the conversion of the printed material, and may simultaneously relax swelling stresses through rearrangement of the crosslinked backbone of the printed material.

Systems

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The proposed 3D gradient control of composition and thus mechanical or other properties is an ideal match to the design technique known as topology optimization. Here, the volume is discretized and each voxel subject to gradient descent to optimize a global property. However, since essentially no manufacturing technique can fabricate the resulting 3D gradient structures, algorithms employ regularization constraints to enforce binarization and self-supporting connected structures. This process is not guaranteed to find optimal solutions and will necessarily disallow some paths between a given initial configuration and optimally performing designs. Second, it is well known that the binary-material constraint itself sacrifices significant performance.

Some embodiments enable new mechanical and photonic performance realized through direct 3D print of gradient designs.

Composite Material

In another aspect, the present disclosure relates to a composite material prepared using the method of the present disclosure. In certain embodiments, the composite material is a 3D printed material. In some embodiments, one or more properties of the composite material has been controlled throughout the material. In certain embodiments, one or more mechanical properties, including but not limited to, at least one of Young's modulus, shear modulus, stiffness, viscoelasticity, and coefficient of friction has been controlled throughout the material. In certain embodiments, one or more electrical properties and/or biological properties has been controlled throughout the material. In some embodiments, this control is on the micron scale.

In some embodiments, the one or more mechanical properties is controlled by at least one of: adjusting the amount of time during which the monomer is irradiated during stereolithography, adjusting the intensity of light used to irradiate the monomer during stereolithography, and/or changing the thickness of the printed monomer layer that is to be irradiated. In some embodiments, controlling the irradiation time, irradiation intensity, and/or layer thickness leads to control of the crosslink density of the resulting material. In certain embodiments, changes in crosslink density lead to the properties of the resulting material. In some embodiments wherein the stereolithography method comprises the step of immersing the printed material in a solution of filler species dissolved in solvent, the one or more mechanical properties of the composite material can be controlled by further crosslinking of excess crosslinkable groups in the printed material with a monomer filler species comprising crosslinkable groups.

In some embodiments, the one or more biological or electrical properties is controlled by the use of additives that affect these properties in a composition for use in stereolithography. In some embodiments wherein the stereolithography method comprises the step of immersing the printed material in a solution of filler species dissolved in solvent, the one or more biological or electrical properties of the composite material can be controlled by using one or more additives that affect these properties as the filler species.

In certain embodiments, the composite material comprises one or more soft layers and one or more stiff layers. In some embodiments, the composite material comprises top stiff layer, a middle soft layer, and a bottom stiff layer. In other embodiments, the composite material comprises top soft layer, a middle stiff layer, and a bottom soft layer. In certain embodiments, the method of the present disclosure is used to print the stiff layers by uniformly illuminating the stereolithography composition, leading to full conversion of the stiff layer and using gradient illumination to print the soft layers, leading to low conversion of the soft layer. In some embodiments, the printed material is immersed in a filler solution comprising a monomer comprising a crosslinkable group and a photoinitiator, and the low conversion layer swells to form a gradient composite material having soft and stiff layers when subsequently UV cured. In certain embodiments, the monomer comprising a crosslinkable group is PEG-norbornene, PEG-dithiol, or a combination thereof. In some embodiments, the gradient composite material is a dental aligner comprising a stiff middle layer covered with soft outer layers.

Control System

A 3-D printer implementing the methods described here can include a control system 1800. The control system 180 can be an electronic device programmed to control the operation of the 3-D printer to achieve a desired result. In some cases, the control system 1800 can be programmed to autonomously carry out a system operation without the need for input (either from feedback devices or users) or can incorporate such inputs. The principles of how to use feedback (e.g., from a flow rate sensor) in order to modulate operation of a component are described, for example, in Karl Johan Astrom & Richard M. Murray, Feedback Systems: An Introduction for Scientists & Engineers (2008).

Figure 19:
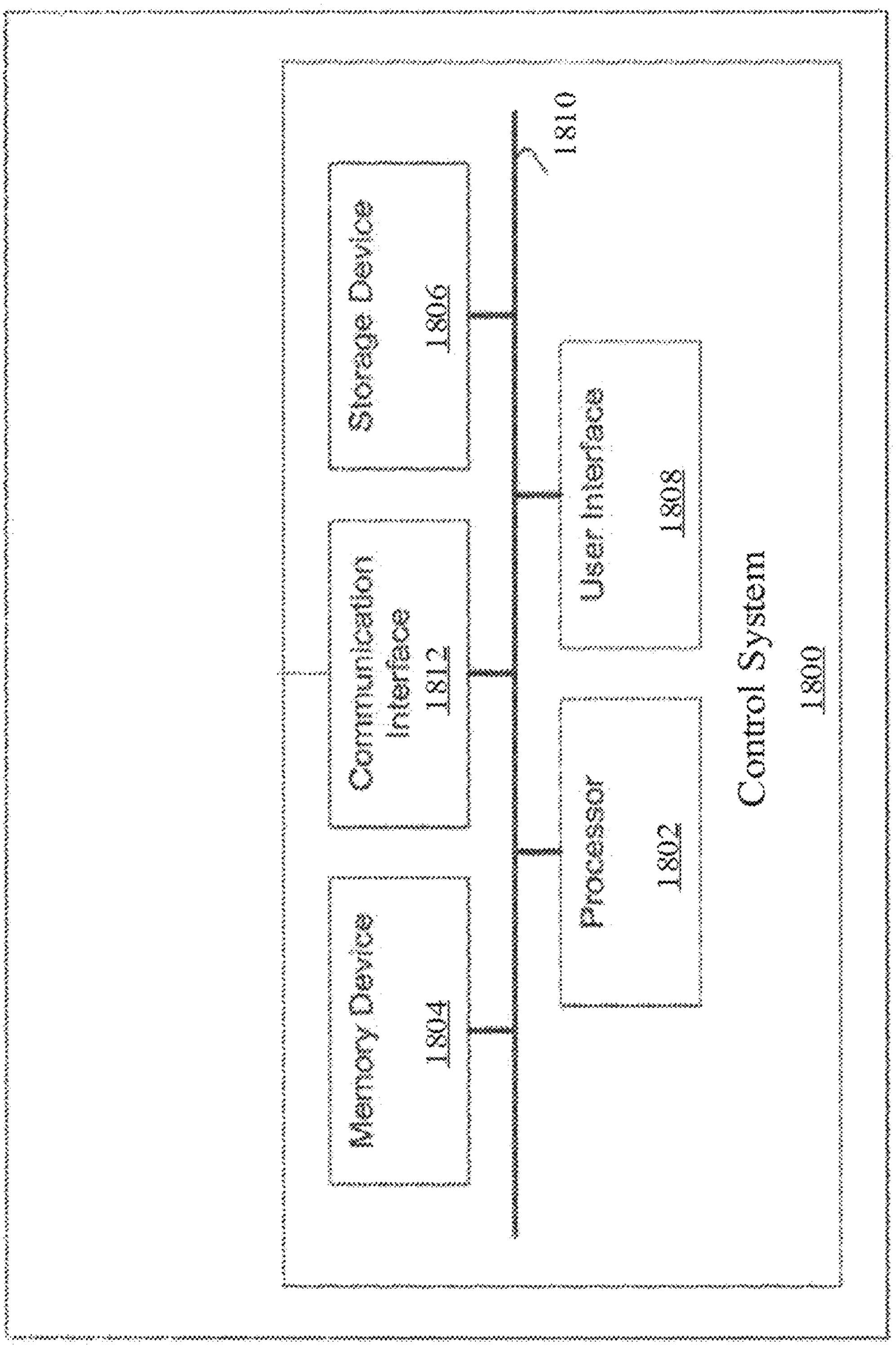
FIG. 19 depicts a control system according to embodiments of the present disclosure.

The control system 1800 can be a computing device such as a microcontroller (e.g., available under the ARDUINO® OR IOIO™ trademarks), general purpose computer (e.g., a personal computer or PC), workstation, mainframe computer system, and so forth. As depicted in FIG. 19, the control system ("control unit") 1800 can include a processor device (e.g., a central processing unit or "CPU") 1802, a memory device 1804, a storage device 1806, a user interface 1808, a system bus 1810, and a communication interface 1812.

The processor 1802 can be any type of processing device for carrying out instructions, processing data, and so forth.

The memory device 1804 can be any type of memory device including any one or more of random access memory ("RAM"), read-only memory ("ROM"), Flash memory, Electrically Erasable Programmable Read Only Memory ("EEPROM"), and so forth.

The storage device 1806 can be any data storage device for reading/writing from/to any removable and/or integrated optical, magnetic, and/or optical-magneto storage medium, and the like (e.g., a hard disk, a compact disc-read-only memory (CD-ROM), CD-ReWritable (CDRW), Digital Versatile Disc-ROM (DVD-ROM), DVD-RW, and so forth). The storage device 1806 can also include a controller/interface for connecting to the system bus 1810. Thus, the memory device 1804 and the storage device 1806 are suitable for storing data as well as instructions for programmed processes for execution on the processor 1802.

The user interface 1808 can include a touch screen, control panel, keyboard, keypad, display or any other type of interface, which can be connected to the system bus 1810 through a corresponding input/output device interface/adapter.

The communication interface 1812 can be adapted and configured to communicate with any type of external device, or with other components of the 3-D printer. The communication interface 1812 can further be adapted and configured to communicate with any system or network, such as one or more computing devices on a local area network (LAN), wide area network (WAN), the Internet, and so forth. The communication interface 1812 can be connected directly to the system bus 1810 or can be connected through a suitable interface.

The control system 1800 can, thus, provide for executing processes, by itself and/or in cooperation with one or more additional devices, that can include algorithms for controlling components of the 3-D printer in accordance with the claimed invention. The control system 1800 can be programmed or instructed to perform these processes according to any communication protocol and/or programming language on any platform. Thus, the processes can be embodied in data as well as instructions stored in the memory device 1804 and/or storage device 1806, or received at the user interface 1808 and/or communication interface 1812 for execution on the processor 1802.

EXPERIMENTAL EXAMPLES

The invention is further described in detail by reference to the following experimental examples. These examples are provided for purposes of illustration only, and are not intended to be limiting unless otherwise specified. Thus, the invention should in no way be construed as being limited to the following examples, but rather, should be construed to encompass any and all variations which become evident as a result of the teaching provided herein.

Without further description, it is believed that one of ordinary skill in the art can, using the preceding description and the following illustrative examples, make and utilize the compounds of the present invention and practice the claimed methods. The following working examples therefore, specifically point out the preferred embodiments of the present invention, and are not to be construed as limiting in any way the remainder of the disclosure.

Example 1: Orthogonal 3D Control of Properties in 3D Printed Structures

The present technology relates to orthogonal three-dimensional control of properties in three-dimensional structures using stereolithography, including stereolithography with multiple materials. When multiple materials are used, the partial light-controlled conversion of monomer to polymer can be used to control swelling of the printed part in a second material, resulting in 3D gradient composites.

The present technology further relates to systems and methods to 3D print a matrix with variable swelling that plastically relaxes stress when later immersed in a solution of reactive filler. True 3D nanocomposites with intimate matrix/filler contact provide dramatically superior mechanical property control than the current alternative, fused deposition of dithered voxels.

Herein, techniques are provided addressing 1) control of this partial conversion in the original print, 2) how this partial conversion controls properties including swelling, 3) what materials can be swelling into the printed part and what properties would this achieve, and 4) how the final composite part would be cured to achieve chemical bonding of the second material with the first in order to make a robust, permanent part.

The present disclosure provides for a wide range of technical effects, advantages, and/or improvements to computing systems and components. For example, various embodiments include one or more of the following technical effects, advantages, and/or improvements: 1) create a new class of additive manufacturing equipment for gradient three-constituent polymer composites via variable-conversion stereolithography of a polymer matrix (a) that controls post-print swelling of a reactive filler (b) carried in a nonreactive solvent and (c) dramatically expand currently achievable properties of stereolithographic materials via polymer composites that provide micron-scale 3D control over viscoelastic behavior; 2) use of unconventional and non-routine operations in a post-fabrication process for millimeter-scale 2D control of inhomogeneous gradient stress of stereolithographic parts via applied strain locally released by photo-initiated plasticity; 3) a characterization protocol for trinary composition versus formulation and processing; 4) a predictive model of printed gradient nanocomposite mechanical properties; and/or 5) a fabrication process for variably-stressed nanocomposites of known properties.

FIG. 1 illustrates a series of steps for 3D printing. The process used begins with traditional stereolithography of a polymer matrix. By precise gray-scale illumination controlled by rigorous process modelling, solid regions of the part above the gelation threshold can be printed with fractional monomer-to-polymer conversion. When the completed part is subsequently immersed in a solution of filler species dissolved in solvent, low conversion regions swell significantly more than areas that received high exposure dose. The printed matrix, swollen in solvent and filler, is then baked and/or exposed to light and/or exposed to a species that promotes a chemical bonding reaction. This initiates covalent bonding of the filler to the matrix and/or the filler itself, may complete the conversion of the matrix, and may simultaneously relax swelling stresses through rearrangement of the matrix backbone.

As illustrated in FIG. 1, gradient intensity SLA (a) prints a 3D part with gradient matrix conversion (b). This is washed to remove unreacted monomer (c), compounding the polymerization shrinkage stress (d). Reactive filler in an inert solvent (e) swells the matrix dependent on the local matrix conversion (f). The filler may subsequently be covalently bound to the matrix and/or itself via a thermal-, photo- or chemical-initiator (g) resulting in a gradient trinary composite (h). Note that steps c-g can be simultaneous or in various combinations but are shown sequentially here for clarity.

Figure 2A:
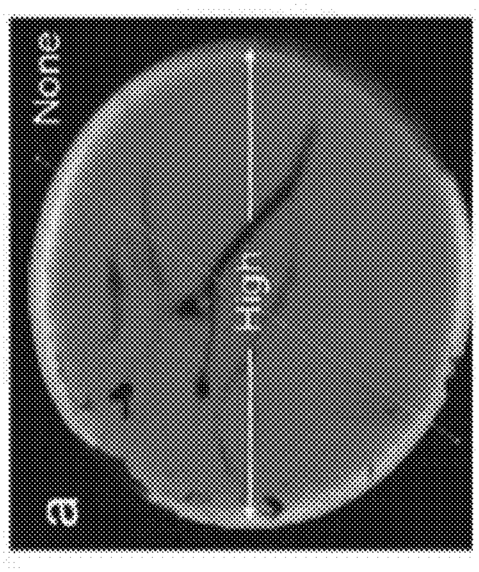
FIGS. 2A-2B illustrate a traditional binary stereolithography (SLA) of matrix that does not swell with filler.
Figure 2B:
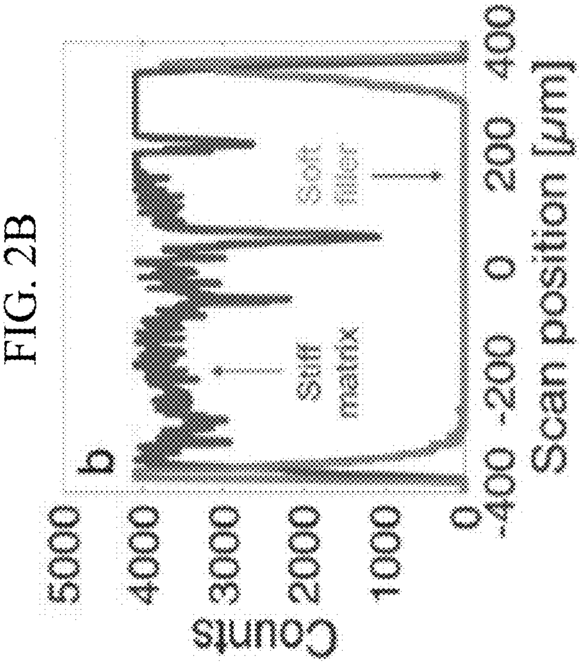
Figure 2C:
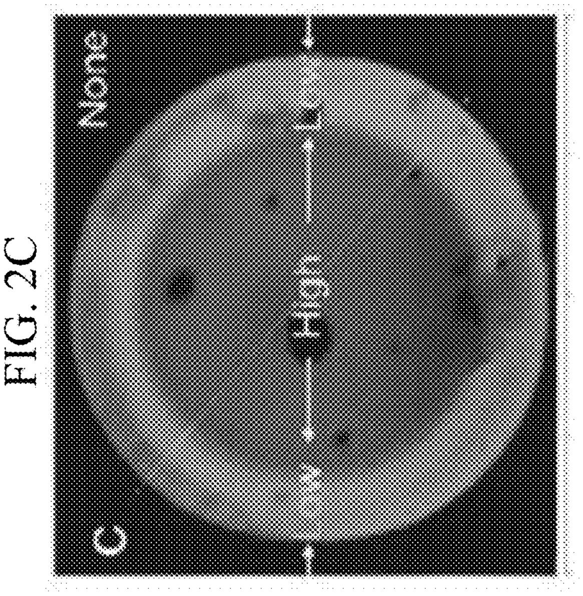
FIGS. 2C-2D illustrate a low conversion matrix that swells to form gradient composite.
Figure 2D:
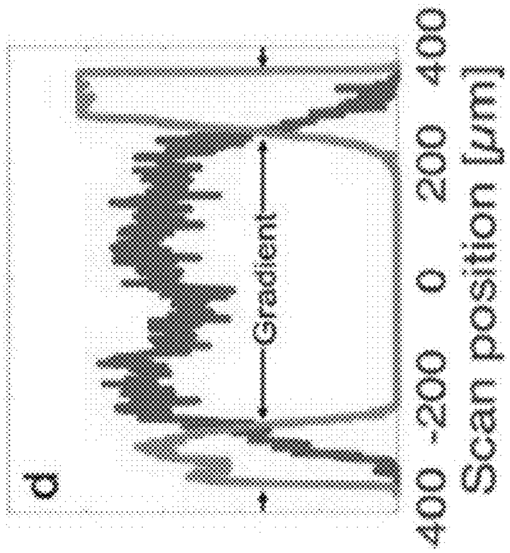
Figure 3:
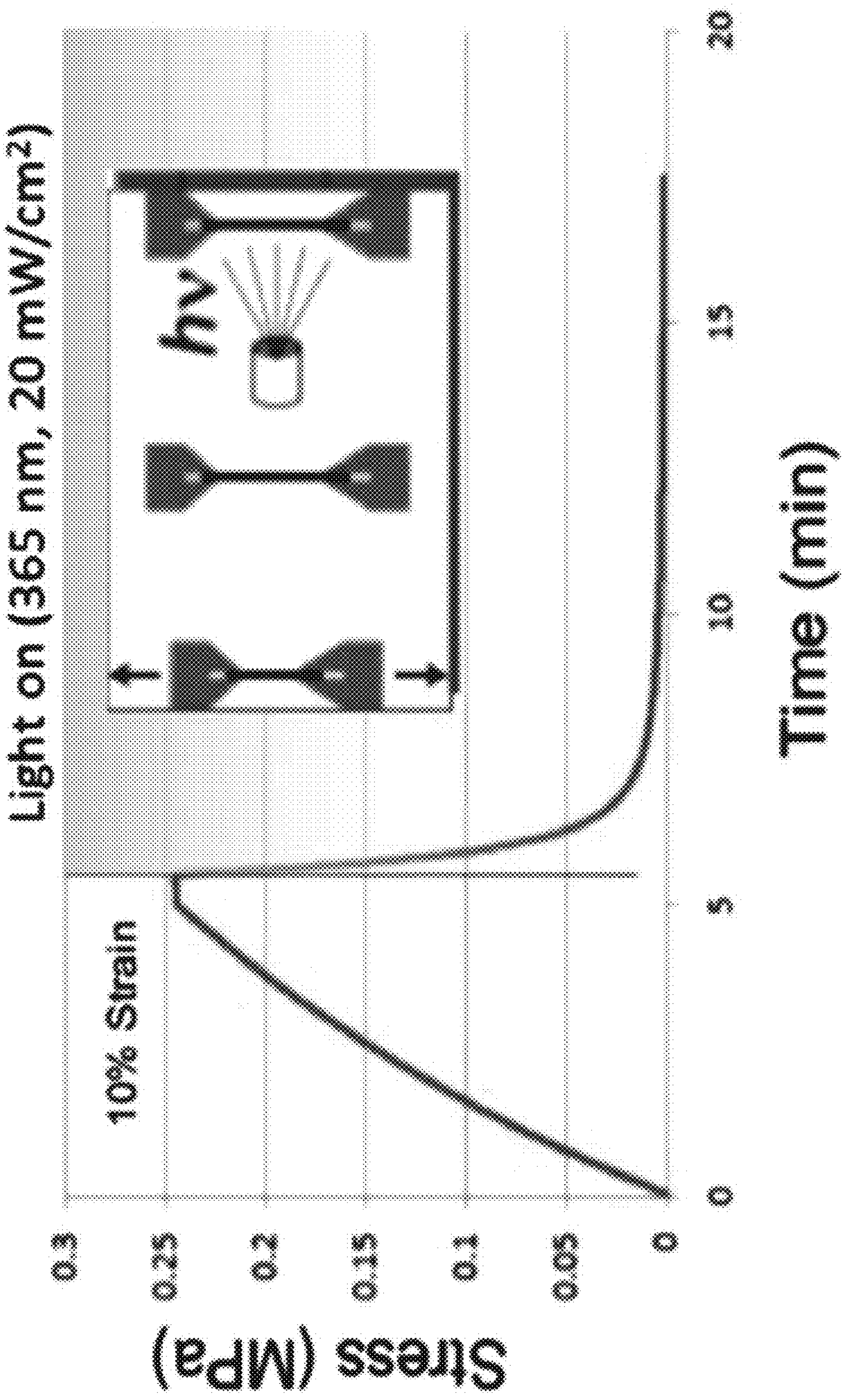
FIG. 3 illustrates induced plasticity of a thiol-ene photopolymerized network.

The preliminary results of FIGS. 2A-2D illustrate the solution provided by various embodiments of the present technology. Here, a 700 dalton polyethylene glycol diacrylate (PEG-DA) crosslinked with a tetra-thiol was uniformly illuminated to print a stiff column at full conversion (FIGS. 2A-2B) or gradient illuminated to print a low conversion, 100 μm shell (FIGS. 2C-2D). When immersed in a filler consisting of 10 kDa PEG-norbornene, 1 kDa PEG-dithiol and additional photoinitiator, the low conversion outer region of FIG. 2C swelled to form a gradient soft/stiff/soft composite when subsequently UV cured. FIG. 2A also illustrates how polymerization shrinkage or removal of unreacted monomer during wash typically causes significant internal stress, compromising SLA mechanical properties. Since various embodiments of the process intentionally swells the part, various forms of stress relaxation including radically-, heat- or catalyst-mediated can be incorporated in the matrix to relax or controllably introduce stress into the printed composites as shown in FIG. 3. These results show that gradient concentration of a reactive filler can be controlled by gradient-conversion SLA of a matrix that plastically deforms to alleviate internal stresses.

Various embodiments of SLA of a variable conversion matrix require much finer process control than traditional binary printing. Unfortunately, modelling of SLA in the literature is incomplete and, for example, does not consider sublinear polymerization kinetics or swelling of the printed part in the resin. A discussion of careful metrology and modeling of a typical polyethylene glycol diacrylate (PEGDA) that enables the necessary control is now discussed. Some embodiments of the modified SLA process depend on this quantitative predictive model of the printing and post-processing steps.

Figures 4A, 4B, 4C, 4D:
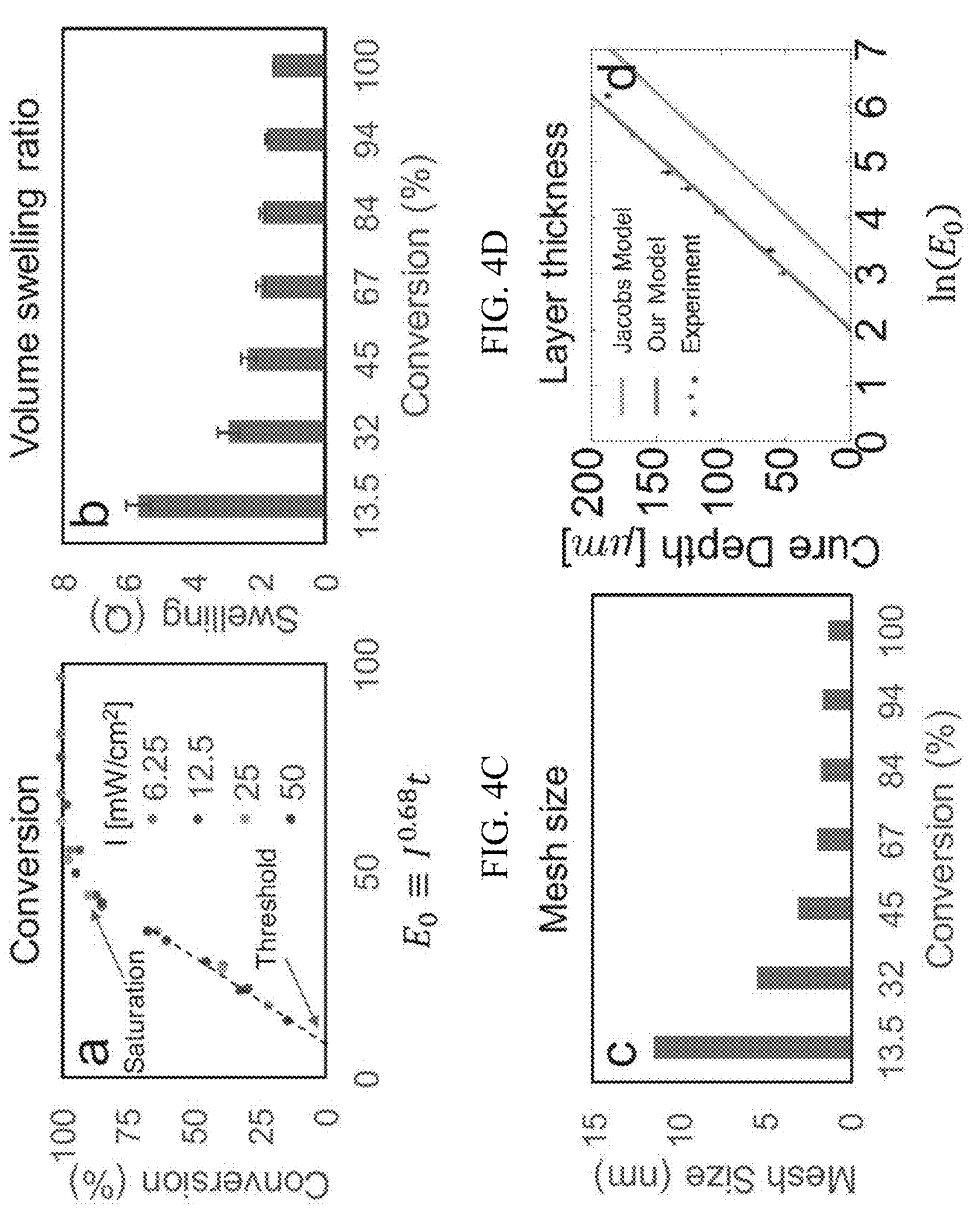
FIGS. 4A-4D illustrate a printing model applied to PEGDA showing conversion is described by a master curve via an effective dose $E_0$ which in turn controls swelling measured by gravimetry and calculated mesh size, and that layer thickness versus exposure conditions can be accurately predicted with these results. FTIR reveals conversion is described by a master curve via an effective dose E # (as shown in Panel a). This in turn controls swelling (shown in Panel b)) measured by gravimetry and calculated mesh size (as shown in Panel c)). Layer thickness versus exposure conditions can be accurately predicted with these results (as shown in Panel d)).

Control over conversion during print begins with real-time Fourier transform infrared (FTIR) spectroscopy of the matrix that reveals, as shown in FIG. 4A, that sublinear initiation efficiency with intensity, oxygen inhibition and monomer depletion can be mapped to a single "master curve" to predict conversion given intensity and exposure time. This local response is modified by non-local diffusion during polymerization, which is omitted from this discussion for brevity. When printing a typical SLA layer using absorber to control thickness, the local intensity and Beer-Lambert absorption can be used to predict conversion versus depth that in turn controls swelling (FIG. 4B) and mesh size that limits filler dimension (FIG. 4C). While printing, the new layer swells in the liquid resin, changing layer thickness. Final thickness is calculated by integrating swelling through the depth which also determines the local conversion and solids content as a function of only the applied intensity, exposure time and absorption (FIG. 4D, blue line). Without these corrections, the traditional prediction of layer thickness and conversion distribution is inaccurate (green line).

In post-processing, unreacted monomer is typically removed from the surface with a quick solvent rinse to avoid the large shrinkage caused by removal of unreacted monomer from the interior. Unfortunately, remaining monomer limits modulus as shown in FIG. 5A. Current SLA appears to solve this problem using a UV post cure to harden the printed part, but the UV absorber limits high conversion to the exterior, leaving a plasticized interior as illustrated in FIG. 5B. Therefore, an alternative post cure was used, comprising a thermal initiator and a post-bake to reach uniformly high conversion (see FIGS. 5C-5E). These results demonstrate that intensity-modulated SLA enables controlled swelling of the part through variable conversion which can be subsequently restored by a post-bake treatment.

Variable Conversion Stereolithography

Traditional SLA printing of discrete layers does not enable the control over monomer conversion required for this invention. In traditional SLA printing, a new layer of resin, e.g. spread by a re-coating blade after each step of the build platform, strongly absorbs a scanning UV laser to limit penetration depth. The exponentially decaying conversion profile of each voxel must be identical, following the "working curve" of FIG. 4D and resulting in variable conversion and thus variable swelling vs. layer depth shown in FIG. 5D.

Figure 6B:
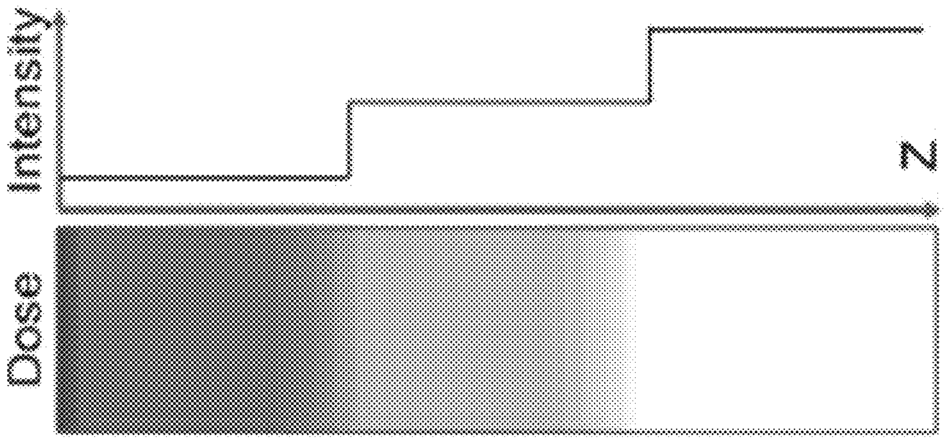
FIGS. 6A-6B illustrate dose vs. depth for discrete and continuous SLA.
Figure 6A:
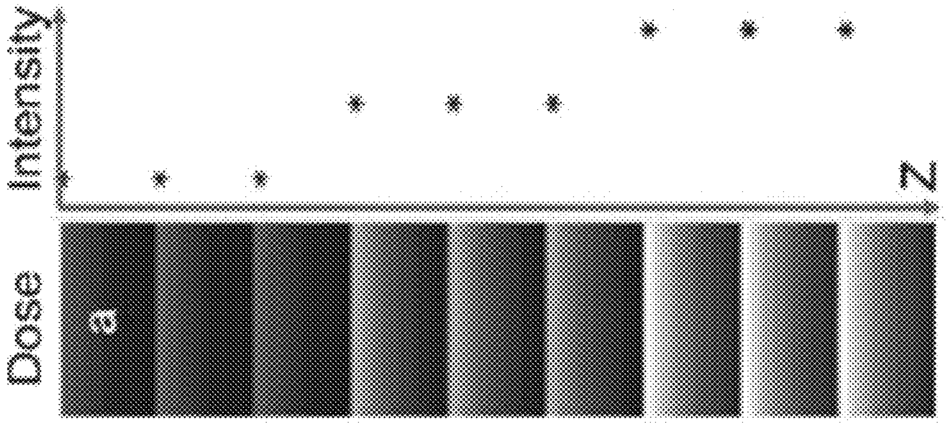

Herein, gradient control over conversion was enabled by continuous translation, as shown in FIGS. 6A-6B. Exponential decay of intensity in depth results in an absorbed dose profile that is the convolution of the applied intensity and Beer-Lambert exponential decay. Current printers use binary intensity levels to apply doses well below or above the gelation threshold of the resin. Conversely, herein a dose below threshold (for voids) is used as well as a continuous dose range between threshold and 100% conversion (see FIG. 4A) to control conversion and subsequent swelling with filler. The minimum depth over which conversion and thus filler concentration can be significantly changed is given by the Beer-Lambert absorption coefficient which also sets the minimum physical thickness, roughly 10 microns, limited by achievable absorption of available photo-absorbers. Additionally, continuous platform motion, gradient exposure intensity, and predictive process modelling can be used to enable control over conversion with the same resolution at which current SLA controls shape.

Gradient Gel Casting Controlled by Partial Conversion

Figure 7:
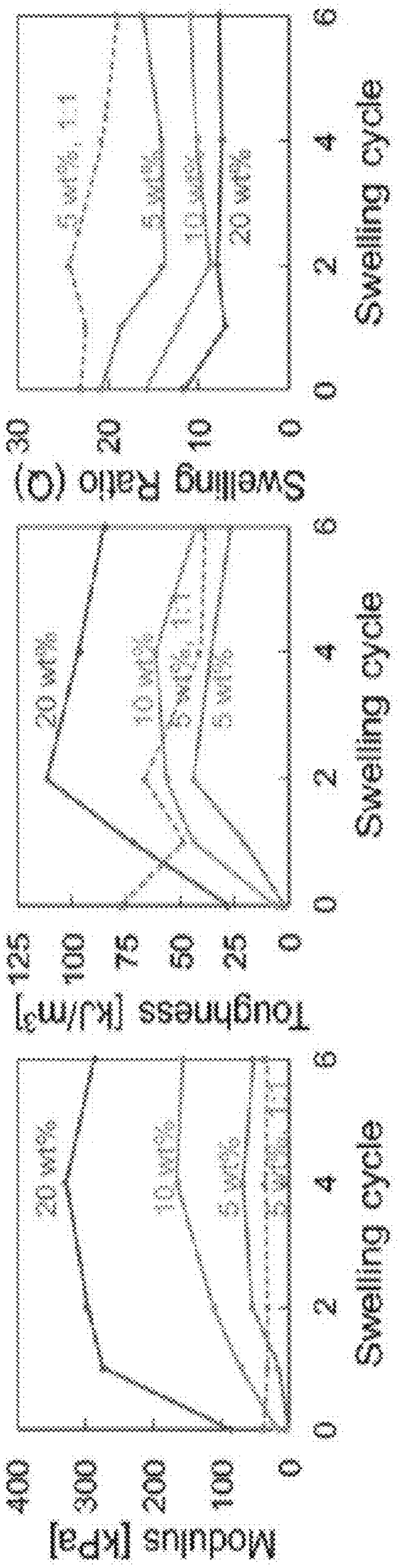
FIG. 7 illustrates second-stage homopolymerization of pendant acrylate functional groups on a thiol-acrylate matrix increases modulus over 100 fold.

"Gradient gel casting" entails the 3D printing of a material wherein a filler solution is applied to the printed material, causing local swelling and resulting in a gel with compositional gradients. The filler solution carries a reactive filler such as a crosslinking monomer or functionalized nanoparticle that will modify matrix mechanical properties. This process of swelling and reaction with a reactive monomeric filler is demonstrated in FIG. 2. The disclosed gradient gel casting process is an improvement over traditional photo-patterned nanocomposites because the photopatterning step which creates the gradient conversion is separated from the swelling step. This will avoid the nonlinearities caused by coupling of these two processes so that the matrix can be programmed with much larger variations in swelling (see FIG. 4B). The filler can subsequently be applied at low concentration in a solvent (reducing agglomeration) and covalently bound to the matrix (suppressing phase segregation) as illustrated in FIG. 7. This shows that filler covalently bound to the matrix is continually replaced, driving composite filler concentration well beyond that of the applied solution. Although not wishing to be limited by theory, it is believed that separation of nanocomposite processing into initial patterning and subsequent swelling/reaction steps will enable dramatically greater property variations than existing nanocomposites formed via simultaneous exposure and swelling.

Thermal Post Cure for Final High Conversion

Figure 8:
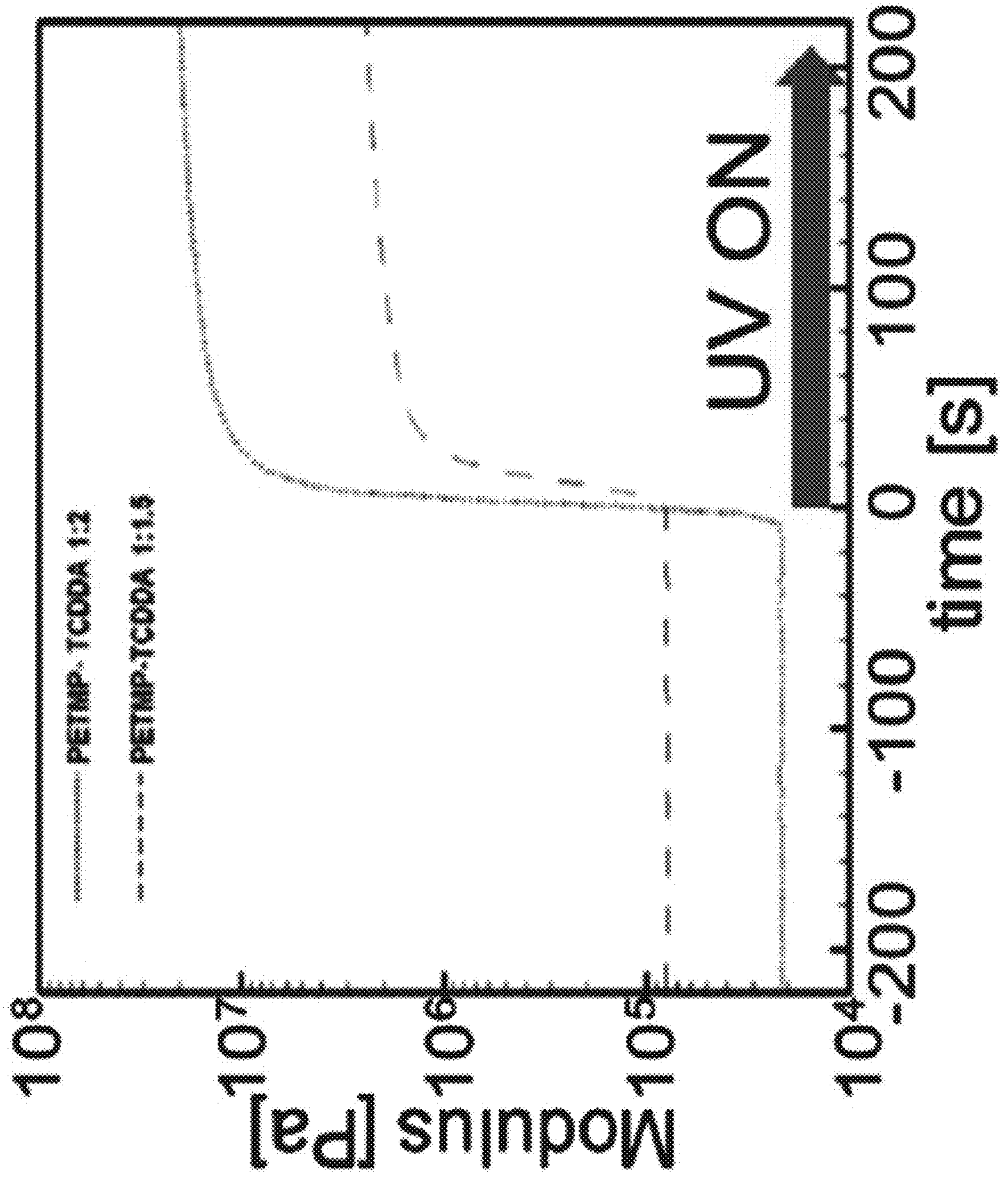
FIG. 8 illustrates evolution of properties of a thiol-norbornene hydrogel of various solids % as a function of multiple gelcasting cycles in which monomer swells the matrix, then is covalently attached to pendant reactive groups via UV flood cure. Expected trends of increasing modulus and toughness and decreasing swelling reverse after roughly cycle 3 due to build-up of stress in the multiple swollen network. A network with no pendant functional groups (dotted) does not display this behavior.

Nanocomposites have not traditionally been exploited as structural materials because they must have low modulus during patterning to enable filler diffusion and simultaneous matrix swelling. This limitation can be overcome by formulating the matrix with excess pendant reactive groups which can later be crosslinked thermally (see FIG. 5) or optically. This greater crosslink density can increase the modulus of the material by over 100-fold, as shown in FIG. 8.

Covalent Adaptable Matrix for Stress Relaxation

The foundation which underlies the disclosed method is the control of each step of the stereolithography process and post-processing of the printed material. In aspects wherein the 3D printed material is immersed in a solution of filler species, the method steps include: (1) gelation from liquid to solid to form the a printed matrix, (2) continued conversion after gelation to control subsequent swelling of filler, (3) reaction of the filler and pendant groups on the matrix, and (4) relaxation of stress via network rearrangement.

Steps (1) and (2) are mediated by photo-initiated radicals during printing and steps (3) and (4) are typically mediated by thermally- or photo-initiated radicals or a catalyst (e.g. a base) in post-processing.

Figure 9B:
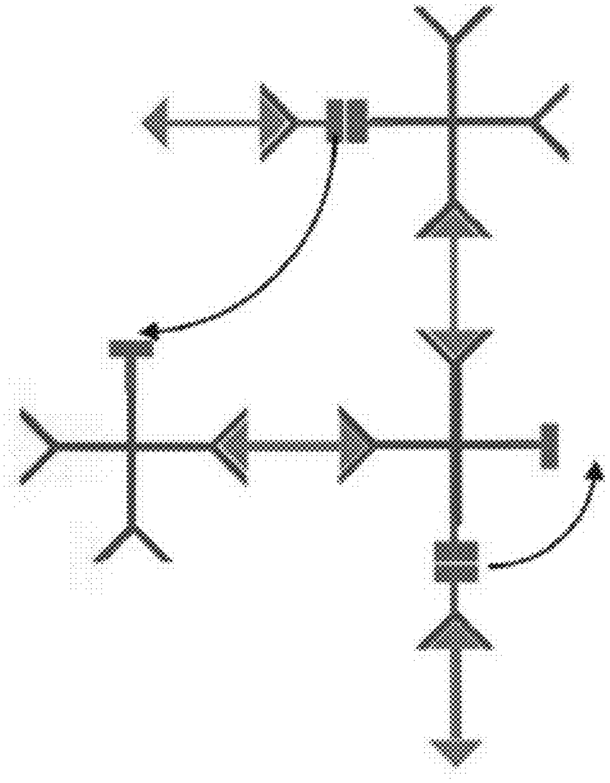
FIG. 9B illustrates a fragment of the dynamic network.
Figure 9A:
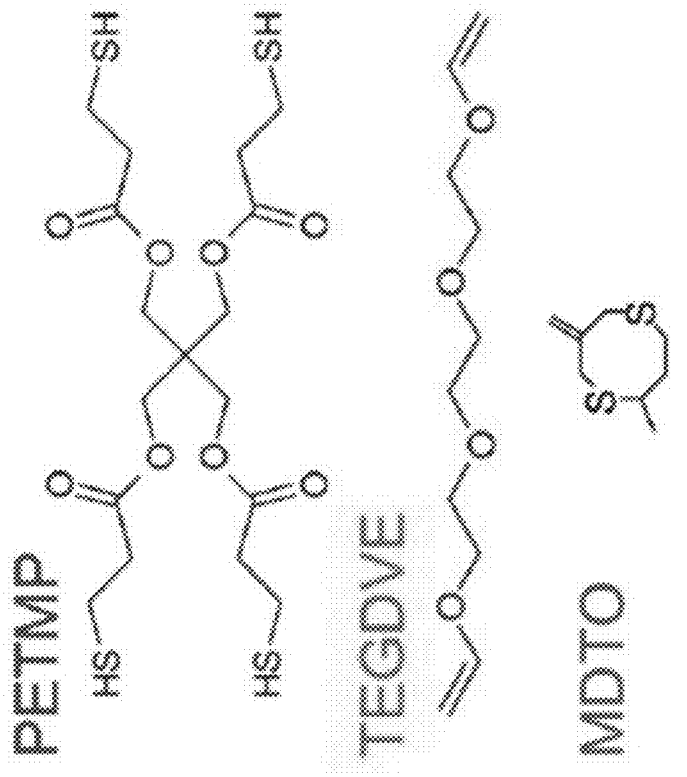
FIG. 9A illustrates monomers including tetra-thiol, divinylether, and a ring-opening monomer which forms the allyl-sulfide link.

FIGS. 9A-9B depict steps (1) and (2) for a reaction between PETMP and TEGDVE in the presences of photoinitiator MDTO. Steps (1) and (2) include the photoprinting of a polymer network formed from the composition of PETMP, TEGDVE, and MDTO. The thiol-vinylether polymerization is classified as a "click" reaction because of its quantitative yield at ambient conditions with minimal side products. Here it is initiated by a photo-generated primary radical that initiates an alternating reaction between thiyl(sulfur-centered) and ene (carbon-centered) radicals (see FIG. 9A). This A:B step growth reaction forms the homogeneous and uniform polymer network shown in FIG. 9B with low polymerization stress. Neither monomer will homopolymerize such that a formulated excess of either group remains after photopolymerization and will only crosslink in the later thermal step in the presence of filler presenting the complementary group. The propagation rate of thiolene reactions of ~$10^6$ L $mol^{-1}$ $cm^{-1}$ $s^{-1}$ is several orders of magnitude higher than acrylates, enabling submicron resolution even in low viscosity dilute resins.

Step (1) is controlled by the formation of a solid gel from the liquid resin at the "gelation threshold," the degree of conversion at which the resin becomes a solid. Unlike inhomogeneous chain growth monomers such as acrylates, the gelation threshold of step growth polymers can be precisely predicted and controlled using Flory-Stockmayer theory. Step (2), in which variable conversion between gelation and saturation is controlled by optical exposure, is also improved by this choice of matrix. In particular, the termination rate of thiol-ene polymerizations is typically very high such that almost no "dark polymerization" occurs after cessation of illumination. This significantly simplifies the creation of the master exposure curve like that of FIG. 4A.

Steps (3) and (4) include filler attachment and stress relaxation wherein two further qualities of the thiol-ene matrix are central to the post-processing steps. First, as graphically represented by the symbols for thiol and vinylether functional groups in FIG. 9B, neither group will homopolymerize. Thus, a formulation with a stoichiometric excess of either group will not fully convert that excess without the introduction of filler that provides the complementary group. In Step (3), the vinylether-functionalized filler will covalently crosslink the thiol-rich matrix when heat is applied to thermally generate radicals. The local concentration of covalently attached filler can be precisely controlled via the stoichiometric excess of thiol groups remaining after partial conversion in step (2). This sequential "two stage" polymerization thus enables precise control over composition.

Step (4), stress relaxation, is an important function of the matrix given the expected large swelling of the matrix with filler. Stress relaxation will occur simultaneously with polymerization during step (3), thus radicals may either form a covalent bond between filler (vinylether) and pendant matrix (thiol) groups or mediate bond exchange via backbone (allylsulfide) links. Although the allyl sulfide sequesters radical species and somewhat reduces the polymerization rate, conversion can still be nearly complete. There is competition between the thiol-vinylether polymerization and allylsulfide addition-fragmentation reactions, however the thiyl radical addition to allyl sulfide predominantly results in addition-fragmentation and thus stress release. Critically, while a fraction of the allyl-sulfide is consumed by a hydrogen-abstraction side reaction with the thiol, a large fraction can remain after complete polymerization and thus is available for further stress relaxation.

The fortuitous retention of allylsulfide groups in the backbone after stress-relaxed bonding of the filler suggests an optional final processing step to program controlled stress distributions. Photoabsorbers can be used to limit the penentration of light during stereolithography and can therefore affect the stress relaxation of the resulting 3D printed material. 2D distributions of internal stress can be programmed in one step by, for example, illumination through a binary contact mask using the stress relaxation illustrated in FIG. 3. While not wishing to be limited by theory, it is believed that allyl-sulfide linkages in the matrix backbone will relax swelling stresses during the thermally-initiated matrix post cure and can also be later exploited to photopattern spatially-localized stress in the finished nanocomposite.

Create and Characterize Conversion in Model Matrix Material

The functional group system of FIG. 9 can be modified to include PEG backbone sections to create a hydrophilic polymer with a degree of swelling in water chosen to meet production and design constraints (e.g., orthodontic design constraints). Many such monomers are available commercially (e.g. 250 Da PEG divinylether, Sigma-Aldrich. The incorporation of PEG into thiol-ene formulations will enable the creation hydrogels with various degrees of swelling as shown in FIG. 2. A commercial photoinitiator, diphenyl(2,4,6-trimethylbenzoyl) phosphine oxide (TPO) or its common water-soluble variant lithium phenyl-2,4,6-trimethylbenzoylphosphinate (LAP) can be used with 405 nm illumination to initiate the polymerization reaction.

Matrix formulations will be created with 0, 25, 50, and 75 wt % MDTO to control the fraction of backbone segments containing dynamic allyl-sulfide links. PETMP and TEGDV ratio will be varied such that at full conversion, the network contains 0, 25, and 50% unreacted thiol functionality. Conversion of both thiol and vinylether functional groups will be monitored by FTIR versus time and intensity. The data will be fit to a master curve like that of FIG. 4A.

Example 2: Microscale Photopatterning of Through-Thickness Modulus in a Monolithic and Functionally Graded 3D Printed Part Materials and Methods Materials Poly(ethylene glycol) diacrylate (PEGDA 700, Aldrich), pentaerythritol tetrakis(3-mercaptopropionate) (PETMP >95%, Aldrich), Diphenyl(2,4,6-trimethylbenzoyl) phosphine oxide (TPO, 97%, Aldrich), 2-(2-hydroxyphenyl)-benzotriazole derivative (Tinuvin® CarboProtect®, BASF Company).

Custom-Built DLP System

This study used a custom-built DLP system for 3D printing. This DLP uses a 405 nm LED (SOLIS-405C, Thorlabs) as a light source and a spatial light modulator (1920×1152 Analog SLM, Meadowlark Optics) as the programmable mask. (FIG. 10A) An acrylate-functionalized glass slide is used as the build-stage. Glass slides were functionalized according to the Gelest Silanation Protocol using 3-(trimethoxysilyl) propyl methacrylate) (98% Aldrich) as the silane. A neutral density filter (optical density OD=4) is used with index-matched immersion oil (Type B, Cargille Laboratories Inc.) to prevent back-scattering. The polydimethylsiloxane print window was prepared using the Sylgard 184 Silicone Elastomer Kit (DOW CORNING) mixed at a 10:1 resin: hardener ratio. The mixture was degassed and cured between two glass slides with a 1 mm spacer at room temperature for 24 hours.

Conversion Measurement

PEGDA 700 and PETMP were mixed at 99:1 ratio by weight with 0.85 wt % TPO as a photoinitiator to enable free radical photopolymerization of the acrylate groups under UV-vis exposure and 0.8 wt % Tinuvin® CarboProtect® photoabsorber. Real-time Fourier Transform Infrared Spectroscopy (RT-FTIR), was utilized for kinetic analysis using a Nicolet 6700 FTIR spectrometer (Madison, WI) with a KBr beam splitter and an MCT/A (Mercury-Cadmium-Telluride A) detector. The resin sample was placed between glass slides with 127 μm spacers. A 405 nm LED was used (M405L2-C5, Thorlabs) to irradiate the sample. The light intensities used for this study were 3.5 mW $cm^{-2}$, 11.6 mW $cm^{-2}$ and 30 mW $cm^{-2}$. To account for the presence of light absorber, the light intensities were averaged through a depth of 127 μm using the Beer-Lambert Law. Conversion was monitored by the disappearance of the double bond (C=C) peak of the acrylate at 6200 $cm^{-1}$ in the near-IR range. This experiment was repeated with a resin that did not contain photoabsorber for kinetic comparison.

Bulk Mechanical Testing

Unconfined compression testing was conducted (MTS; Eden Prairie, MN; 250 N load cell) on dry cylinder-like structures fabricated using a custom DLP 3D printer. Structures (n=5 per group) were measured for final dimensions (diameter: 2.358±0.01 mm; height: 1.9±0.035 mm), and subjected to a 3 mN pre-load followed by a constant displacement rate of 0.03 mm/s until failure. Deviations from the desired printed dimensions and cylindrical shape were taken into account by calculating stress and strain using measured dimensions and calculating the mean cross-sectional area for each sample. The stress and strain data were analyzed, assuming a Poisson's ratio of 0.5, to yield the true, or "Young's", modulus which is the slope of the linear region of points of the true stress versus true strain curve.

3D) Prints for Model Validation and Z-Control Demonstration

Trapezoidal structures were fabricated at different exposure conditions to validate a model for the effect of light intensity, exposure time and layer thickness on through-thickness elastic modulus. The trapezoid shape was chosen to aid in the sample preparation process. An image of a trapezoid was exposed using a 405 nm LED at $I_0$=30 mW $cm^{-2}$ for $t_{exp}$=6 s at layer thicknesses of 10 μm, 30 μm and 100 μm, at $I_0$=3 mW $cm^{-2}$ for $t_{exp}$=60 s at layer thicknesses of 30 μm and 100 μm, and at $I_0$=15 mW $cm^{-2}$ for $t_{exp}$=12 s at a layer thickness of 10 μm to create structures with a final thickness of 2 mm. Structures with a programmed through-thickness modulus profile were exposed with changing exposure conditions ($Z_L$ and $t_{exp}$) throughout key layers of the print. All of the structures were irradiated for $t_{exp}$=0.6 s at $Z_L$=10 μm for the first 100 layers. In the structure from FIG. 11A, the stage was subsequently moved by 146 μm followed by five 1 μm exposures at $t_{exp}$=6 s. In the structure from FIG. 11B, the stage was moved by 126 μm followed by five 1 μm exposures at $t_{exp}$=2.4 s. In the structure from FIG. 11C, the stage was moved by 126 μm followed by five 1 μm exposures at $t_{exp}$=1.2 s. In all cases, the remaining layers were irradiated for $t_{exp}$=0.6 s.

AFM Sample Preparation and Testing

Atomic force microscopy (AFM, Cypher, Asylum Research) was used in fast force mapping (FFM) mode to measure the elastic modulus along the surface of cross-sectioned 3D printed parts. A cryo-ultramicrotome (Leica, EM FC7) was used to generate a nanometer-smooth cross-section of the printed structures required for accurate FFM. Compression testing specimens of the fully polymerized material were periodically referenced to calibrate small changes in tip radius. The indentation rate was 300 Hz, the max force setpoint was 60 nN, and the force distance was 800 nm. The force curves were analyzed through a fitting routine using the Johnson Kendall Roberts (JKR) model to extract the elastic modulus while considering adhesion effects. AFM scans (30 μm×30 μm) were digitally stitched to produce a measurement of the photopattern of the printed part. For visualization of the modulus variation, cross-sectional profiles were obtained from the center row of the stitched image and compared to the arithmetic mean taken across all pixels along the vertical, y, axis.

Nanoindentation Sample Preparation and Testing

Instrumented indentation testing was performed on a Hysitron TI-950 Triboindenter (Bruker, Eden Prairie MN) using a 5 μm (nominal), 4.032 μm (Calibrated), radius cono-spherical probe and XZ-500 extended displacement stage. Prior to testing, the 100 μm thick layered sample was stored with a desiccant for 7 days. Upon removal from the container, two layers in the center of the sample were identified as the region of interest for testing. A 4×11 array of indents with 10 μm spacing was placed to span two central 100 μm layers. The starting point of each row was staggered by 2.5 μm to create effective spacing of 2.5 μm across the width of the layer and avoid overlapping indentation stress fields. Indents were performed using a load function in displacement control as follows: a surface find was performed with a 2 μN preload, the probe was then fully retracted by 1000 nm before re-approaching the sample at 100 nm/s and testing to a peak displacement of 1250 nm relative to the initial surface find. The peak displacement was held for 5 seconds (i.e., due to no viscoelastic creep observed during longer hold times) before unloading at 100 nm/s to a height of 1000 nm above the initial surface find. The 1000 nm lifts pre- and post-indentation allowed the full adhesion response to be captured for analysis. For each nanoindentation test, the region of the unloading curve between the initial unloading point and the point of maximum adhesion was fit to the nano-JKR model, as described by Kohn & Ebenstein and Poisson's ratio of 0.5 was assumed to calculate Young's modulus.

Results and Discussion

To address the shortcomings found in materials printed using conventional 3D printing, improvements in mechanical robustness and flaw tolerance can be obtained with functionally graded materials. Functionally graded materials (FGMs) in the context of additive manufacturing and prototyping draw interest for their ability to mimic the changing properties found in natural structures. Not only do FGMs have enhanced mechanical behavior, but they are able to match the graded properties found in biological tissues; examples include the dentin-enamel junction of the tooth, the osteochondral (bone-cartilage) unit, the bone-cartilage-bone junctions of the growth plate in long bones, and the bone to tendon region, among others. To withstand a broad range of physiological forces and prevent premature failure of structures, a method of fabricating FGMs with 3-dimensional, microscale control must be developed (Kuang, X. et al., "Grayscale digital light processing 3D printing for highly functionally graded materials," Sci. Adv. 2019, 5: eeav5790).

Most efforts to fabricate FGMs using 3D printing are limited to inkjet methods that use multiple printheads to deposit different materials on the build stage. However, these methods rely on the jetting of material, which suffers from low resolution (>200 μm), slow print speed (50-150 mm/hour), and strict viscosity requirements. More recently, photopatterning and digital light processing (DLP) vat polymerization 3D printing has been used to create functionally graded materials (Kuang, X. et al., "Grayscale digital light processing 3D printing for highly functionally graded materials," Sci. Adv. 2019, 5: eeav5790; Cox, L. M. et al., "Tunable Mechanical Anisotropy, Crack Guiding, and Toughness Enhancement in Two-Stage Reactive Polymer Networks, "Adv. Eng. Mater. 2019, 21:1900578). DLP uses a spatial light modulator (SLM) to project a series of two-dimensional images into a resin vat to create a three-dimensional object from a computer aided design file. Since DLP uses a single vat of precursor solution, or resin, it is generally regarded as unsuitable for fabricating parts that vary in mechanical spatial functionality or material properties in a precise manner. Although methods that switch between multiple vats of resin were developed, these suffer from slow print speed and a limited ability to control the gradient at the material interface. DLP methods that use grayscale light intensity to 3D print FGMs were developed to have a broad range of material properties, but have been limited to two-dimensional x-y control in the mm-cm range (Kuang, X. et al., "Grayscale digital light processing 3D printing for highly functionally graded materials," Sci. Adv. 2019, 5: eeav5790; Yin, H. et al., "Orthogonal programming of heterogeneous micro-mechano-environments and geometries in three-dimensional bio-stereolithography," Nat. Commun. 2018, 9:4096).

The present disclosure builds upon recent advancements in the area of front photopolymerization kinetics to present a novel approach for predicting, verifying and controlling conversion through the multi-layer depth of a 3D printed part (Vitale, A. et al., "Frontal Conversion and Uniformity in 3D Printing by Photopolymerisation," Materials, 2016, 9:760). Pioneering works focused on nonuniform photocuring in depth were combined with recent findings that energy dose E as a product of intensity $I_0$ and exposure time $t_{exp}$ alone does not adequately describe the polymerization kinetics of the radically-initiated photopolymers used for 3D printing. Rather, to predict a more representative effective exposure E*, the value of $I_0$ must be rescaled by some exponent to broadly describe kinetics for a range of light intensities such as those experienced due to light absorption through the layer or part thickness. Notably, the dependence of kinetics on effective exposure rather than energy dose expands the range of functional gradients that can be printed from a single precursor resin. Herein, the experimental parameter space for 3D microscale control of mechanical properties within a monolithic part is described. Furthermore, the present disclosure demonstrates that gradients can be controlled through combination of layer-thickness, light intensity, and exposure time. By modeling the phenomena responsible for the intrinsic conversion variation with depth, mechanical step functions and property gradients can be imparted within 3D printed parts in an unprecedented fashion. This variation can be utilized to achieve complex functionally graded z-profiles that are unrestricted to the direction of printing. Sharp step functions up to 30 MPa over distances of ~5 μm or gradual change in elastic modulus of 30 MPa over 100 μm are achieved without the need for multiple materials. This micron-scale control of modulus is experimentally verified via nanoscale mechanical testing along the z-axis of a 3D printed part.

Figure 10A:
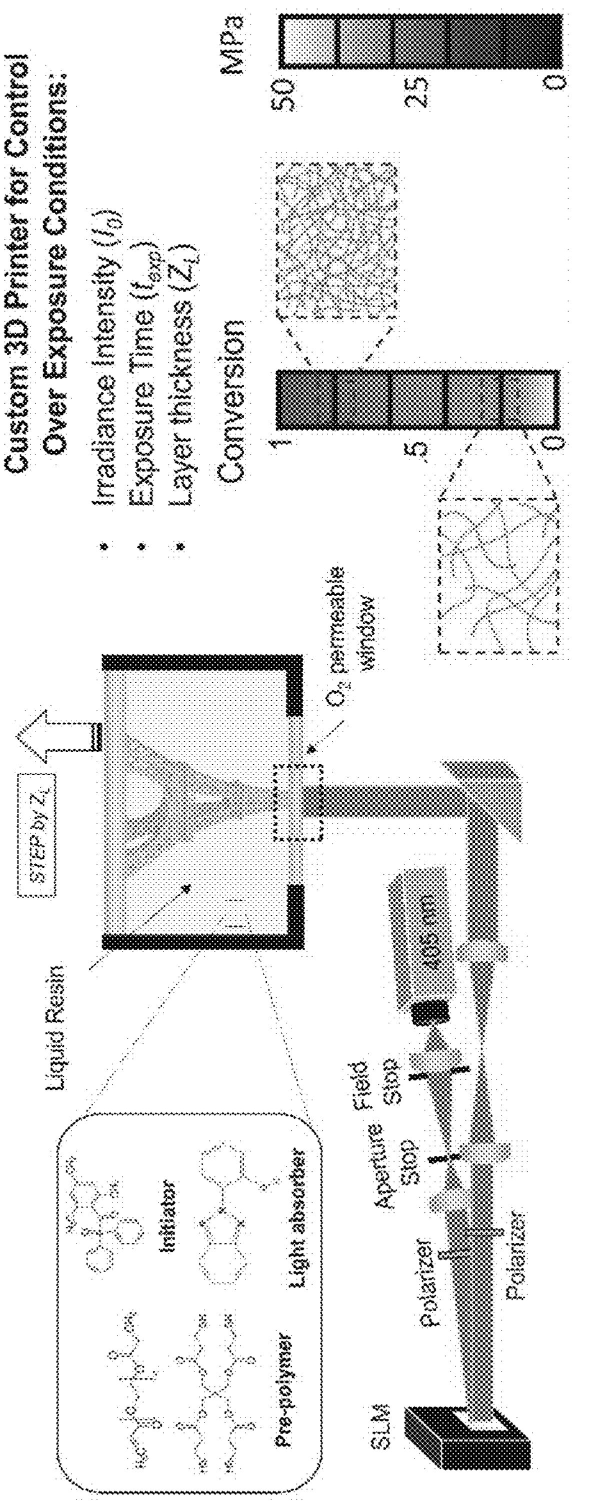
FIG. 10A depicts a custom-built DLP printer for control over irradiance intensity ($I_0$), exposure time ($t_{exp}$) and layer thickness ($Z_L$). These parameters are varied to produce controlled z-direction conversion, which is measured by AFM modulus mapping of cross-sectioned parts. Scale bar in 10A applies to modulus maps of 10B, 10C, and 10D.
Figure 10B:
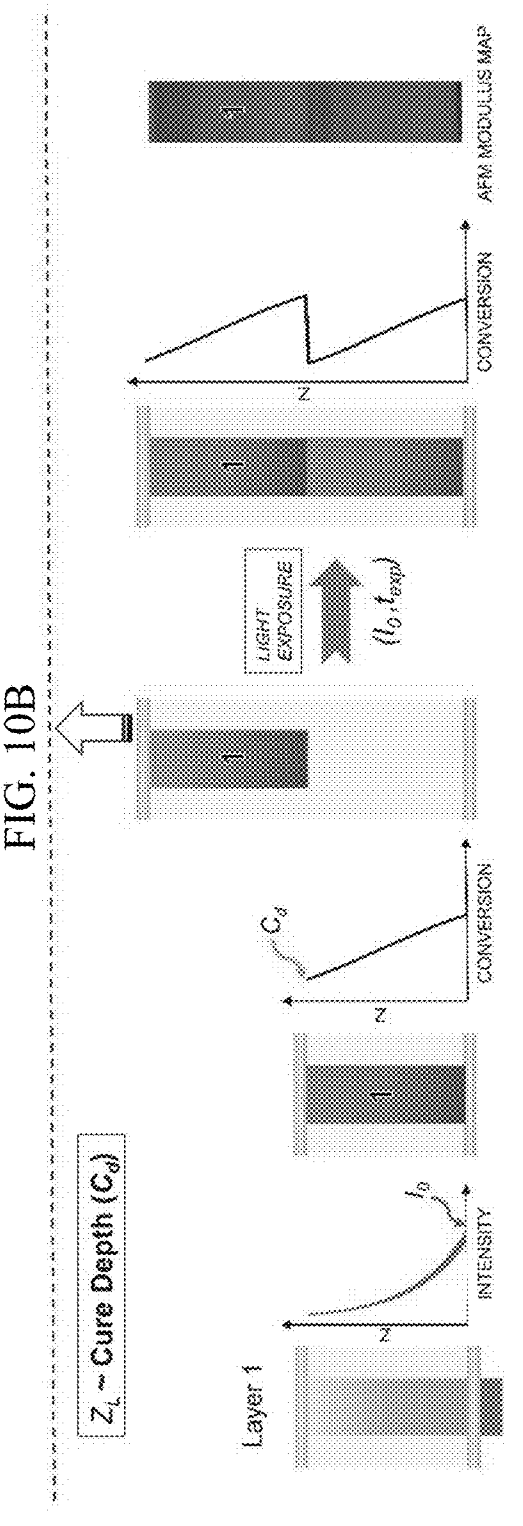
FIG. 10B depicts that a light absorber causes an exponential decay in light intensity along the depth of each exposed layer leading to a decay in conversion and only a finite thickness of resin undergoes gelation. This thickness is known as the cure depth ($C_d$). When the layer thickness ($Z_L$) is comparable to the cure depth, there is a large change in conversion and thus modulus along the depth of each layer.
Figure 10C:
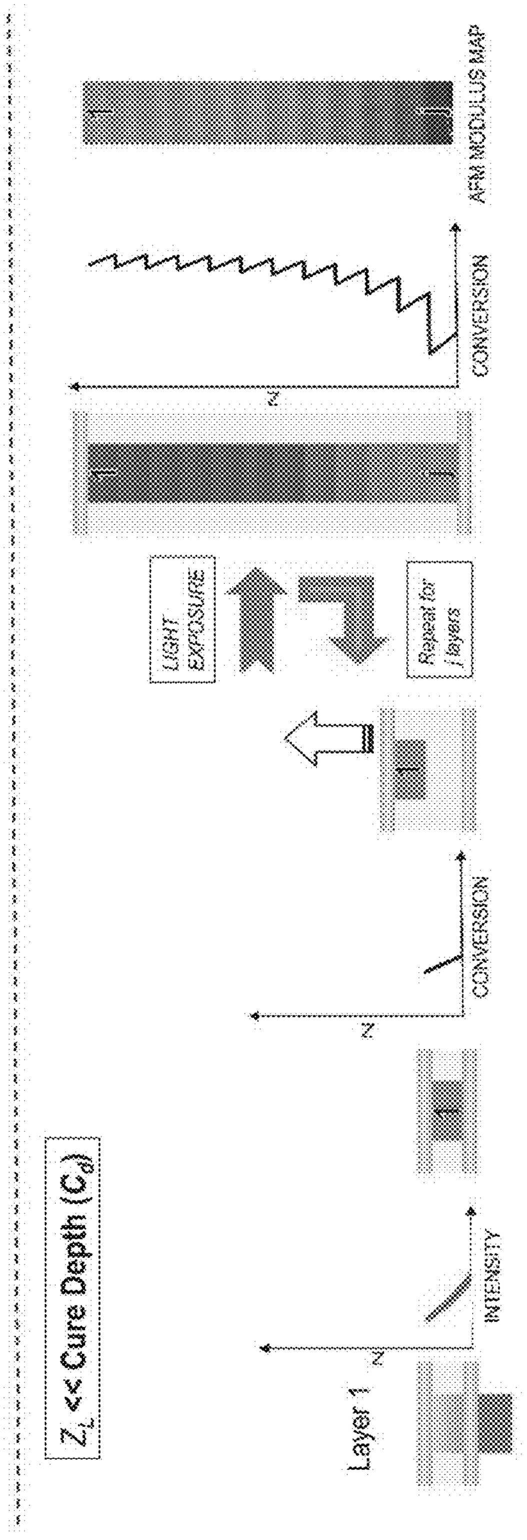
FIG. 10C depicts that when the layer thickness is much smaller than the cure depth, each layer experiences multiple light exposures due to light penetration in the layer-by-layer printing process.
Figure 10D:
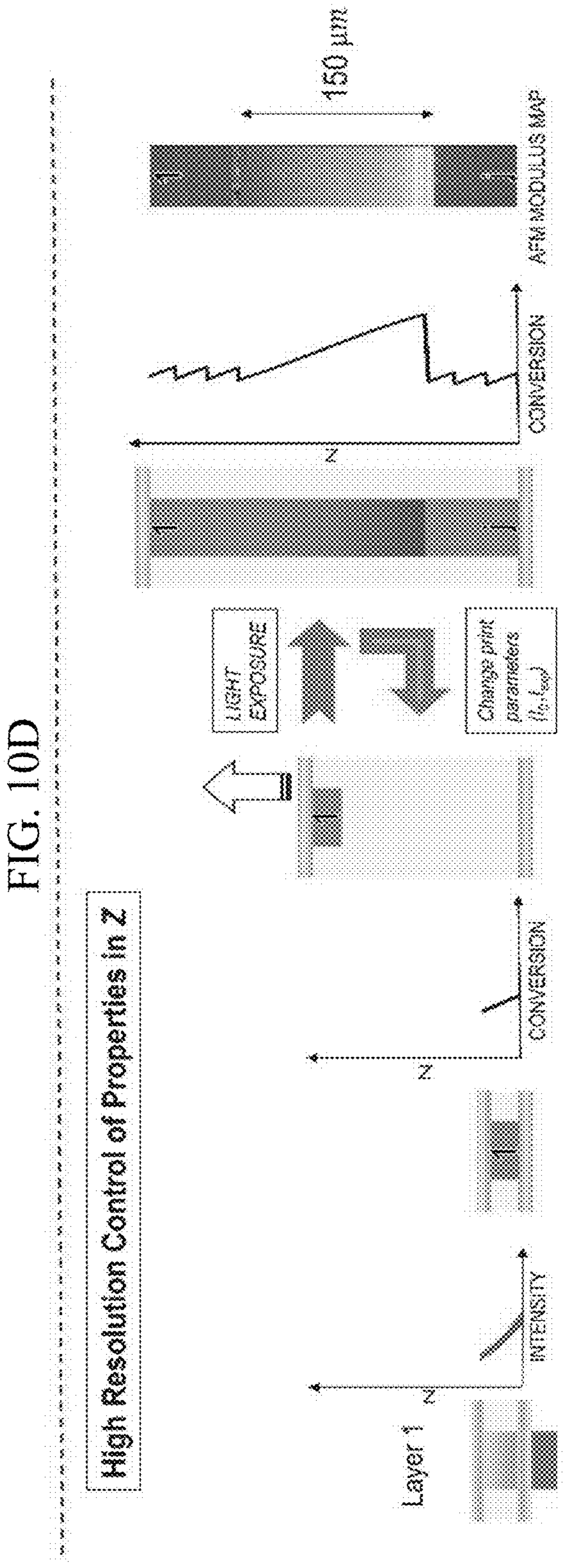
FIG. 10D depicts that micron-scale control of properties in z is achieved in a single material by a implementing computational model that incorporates layer thickness, cure depth, irradiance intensity and exposure time.

In this work, a model acrylate photopolymer resin was used that is comparable to commercial 3D printing materials to demonstrate modulus control in z. The disclosed approach exploits the fact that bottom-up DLP printing (FIG. 10A) has two controls on z-resolution: the light penetration depth and the step size for each layer. Conversion in each printed layer varies from a maximum, just past the oxygen inhibited region near the print window, to a value defined by the gelation threshold for the case when layer thickness equals cure depth (FIG. 10A). The cure depth is defined by the gelation threshold that is described by an exponential decay in light intensity and is governed by Beer-Lambert absorption, exposure conditions (i.e. layer thickness, light intensity, exposure time), and polymerization kinetics. When the layer thickness $Z_L$ is approximately equal to the cure depth $C_d$, a gradient in conversion occurs and is the same in all layers within the part (FIG. 10B). When the layer thickness $Z_L$ is less than the cure depth $C_d$, each layer experiences overlapping light exposures from subsequently printed layers, causing an increase in conversion in the previously printed layers (FIG. 10C). Modeling this process allows for toggling between each scenario to fabricate functionally graded parts with microscale control (FIG. 10D).

Figures 12A, 12B, 12C:
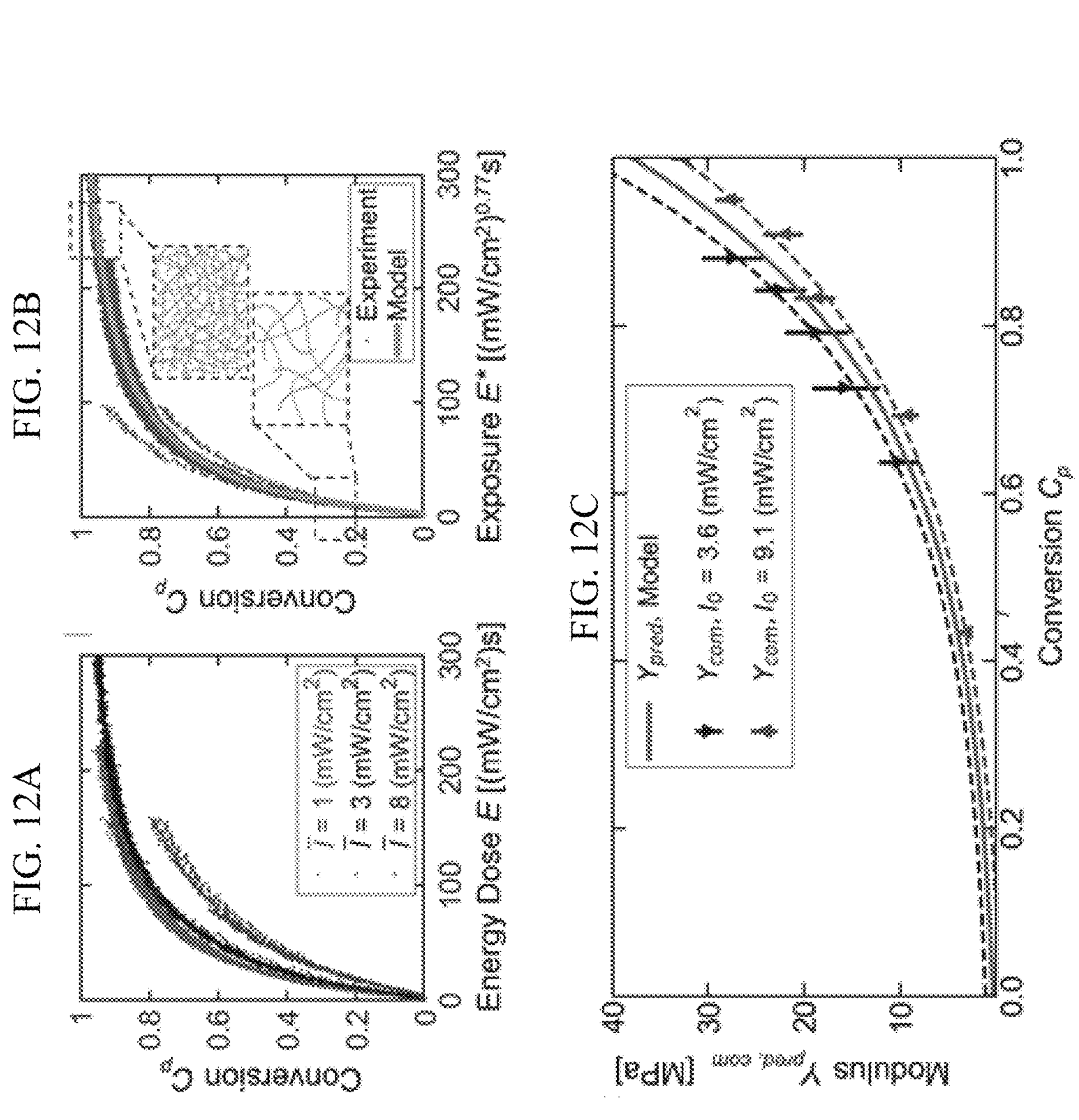
FIG. 12A depicts the acrylate monomer conversion as a function of intensity and exposure time. Reciprocity would cause these curves to overlap when plotted versus energy dose, the product of light intensity and exposure time; instead it was found that the material has a sub-linear response to intensity and conversion is dependent on a scaled intensity.
FIG. 12B depicts the monomer conversion as a function of exposure condition can be expressed by a single predictive master curve (green), by accounting for the sublinear response in optical intensity. Shown is the double-bond conversion as measured by RT-FTIR, for three exposure intensities. The x-axis is a scaled exposure dose $I_0^m$ t, where the scaling factor m=0.77.
FIG. 12C depicts the compressive Young's modulus ($Y_{com}$) of bulk, optically thin layers is plotted against conversion for multiple exposure conditions, yielding a predictive curve (magenta). Error bars indicate one standard deviation.
Figure 12D:
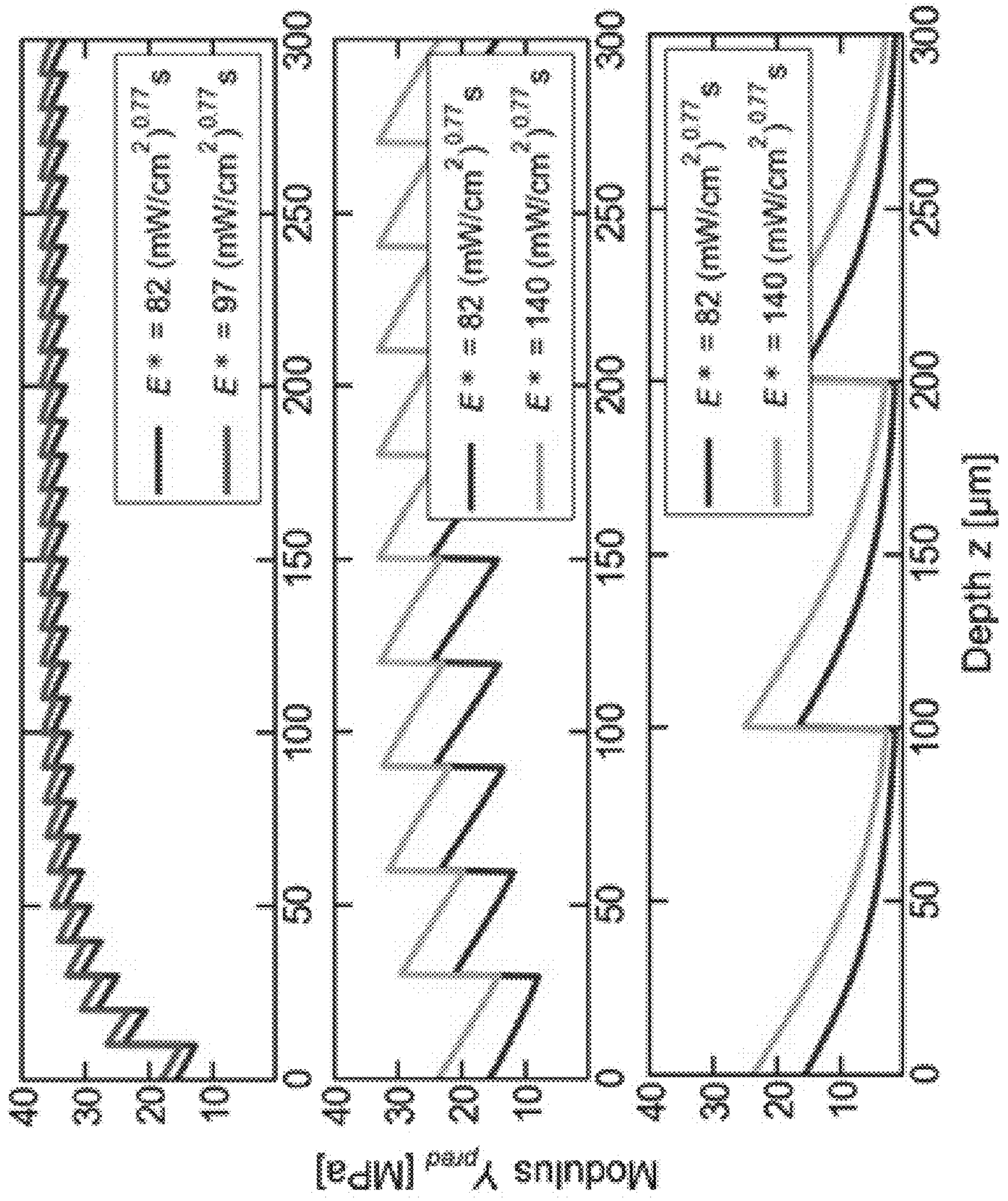
FIG. 12D depicts the through-thickness Young's modulus variation predicted via the scaled exposure model ($Y_{pred}$) for a constant energy dose (E=180 mJ/cm$^2$) while varying layer thickness Zr between 10 μm, 30 μm, and 100 μm and different effective exposure. The different intensity and time combinations give differing exposures (E*), which controls the positive gradient achieved by the 10 μm layers (red vs. purple) and the negative gradient achieved by a 100 μm layer (yellow vs. purple). In both cases, a higher effective exposure causes a steeper gradient in the positive direction (red, $Z_L$=10 μm) and negative direction (yellow, $Z_L$=100 μm). The exposure conditions chosen are the same as the ones used for experiments in FIGS. 13A-13C.

To model the modulus profile in a 3D printed part from a series of exposures and layer thicknesses, the relationship between conversion, accumulated energy dose, and cure depth must first be described. However, earlier models often simplify the photochemical reactions by assuming that resins are "reciprocal," meaning that the resin response depends only on the product of intensity ($I_0$) and time ($t_{exp}$). This assumption often fails for radically-initiated photopolymers. While primary photochemical reactions such as absorbance and initiator cleavage follow the first order scaling of reciprocity, radical polymerizations are known for their sub-linear dependence on light intensity due to subsequent bimolecular radical termination. Thus, the kinetics in photopolymerization as a function of light intensity $I_0$ and exposure time $t_{exp}$ often cannot be described solely by optical energy dose $E=I_0\,t_{exp}$, particularly at the high intensities and small volumes required for 3D printing. Instead, previous work showed that polymerization kinetics in acrylate-based resins are related to light intensity by a power law where conversion $C_p$ is proportional to the product of intensity raised to a power m and time $t_{exp}$, $$C_p \propto I_0^m t_{exp};$$

thus giving effective exposure $E^*=I_0^m t_{exp}$ (Uzcategui, A. C. et al., "Understanding and Improving Mechanical Properties in 3D printed Parts Using a Dual-Cure Acrylate-Based Resin for Stereolithography," Adv. Eng. Mater. 2018, 20:1800876). For a given position in z, the polymerization regime is preceded in time by an oxygen inhibition regime, which determines the intensity and exposure duration required to overcome the inhibition threshold. In traditional models of DLP and stereolithography (SLA), the energy required to overcome inhibition and reach gelation is known as the critical energy dose, $E_c$, where $E_c=I_0 t_c$ and $t_c$ is the critical time to gelation. The previous work showed that rather than using the traditional $E_c$, the exposure conditions to overcome the gelation threshold can more accurately be modeled by using a scaled critical exposure $E_c^*=I_0^n t_c$; this leads to a more representative working curve that describes cure depth $C_d$ as a function of $E_c^*$, absorbance, irradiance intensity and exposure time. The importance of differentiating between the n in $E_c^*$ and m in E* is further described in Uzcategui et al (Uzcategui, A. C. et al., "Understanding and Improving Mechanical Properties in 3D printed Parts Using a Dual-Cure Acrylate-Based Resin for Stereolithography," Adv. Eng. Mater. 2018, 20:1800876). To determine the value of n, the curing kinetics were studied using real-time Fourier Transform Infrared Spectroscopy (RT-FTIR) to correlate $C_p$ with $I_0$ and $t_{exp}$ as established previously. Earlier works have simplified RT-FTIR measurements by performing them on resins without added photoabsorber. However, the photoabsorber used in this study significantly affected the polymerization kinetics of the resin, and thus was incorporated into the RT-FTIR resin formulation to better represent the kinetics in the 3D-printed parts. To account for the presence of absorber, the mean of the Beer-Lambert exponential decay function was used to get mean intensity through depth, $\bar{I}$. The scaling factor n=0.53 was found by measuring $E_c$ for multiple exposure conditions, ultimately resulting in $E_c^*=0.96$ [(mW $cm^{-2})^{0.53}$ s]. Conversion is plotted as a function of time and intensity using a scaling factor m=1 (i.e. assuming reciprocity) and using common energy dose ($E=I_0^1 t_{exp}$) in FIG. 12A. Conversely, the same data can be collapsed on to a single master curve by adjustment of m. To find m, the linear portion of the conversion curve was extracted for each exposure condition. The value of m was varied to minimize the error between the initial slopes, resulting in a best fit master curve with m=0.77. The scaled data were fit to an empirical relationship with each regime scaled to the appropriate light intensities (FIG. 12B). A third order polynomial function most accurately captured the shape of the master curve, which was not achieved from the steady-state approximation. The master curve for conversion was fit to, $$C_p = \frac{x^3 + ax + b}{x^3 + cx + d}, \tag{1}$$

where $$x = I_0^m\left(t_{exp} - \frac{E_c^*}{I_0^n}\right), \tag{2}$$

and a=2.32×$10^5$, b=−1.38×$10^5$, c=2.20×$10^5$, and d=6.35×$10^6$. Previous work demonstrated that modulus scales exponentially with conversion. Thus, a second master curve was fit to Young's modulus ($Y_{com}$) as a function of $C_p$ to derive a predictive relationship for $Y_{pred}$ ($C_p$) defined by, $$Y_{pred}(C_p) = Y_c\exp(\beta C_p) + Y_d, \tag{3}$$

where $Y_c$=0.88, β=3.77, and $Y_d$=0.52 are fitting parameters. To determine the relationship between conversion and modulus, a series of optically-thin and thus nominally homogeneous layers ($Z_L$=2 mm, no photoabsorber added) were printed with varying exposure conditions and evaluated for Young's modulus under compression. The results (FIG. 12C) indicate that local modulus can be approximated in the model solely as a function of local conversion. This model also has the advantage of being simple to invert mathematically, unlike one based on intensity. The scaled model was inverted and applied to a diverse set of printing conditions to investigate the impact of layer thickness $Z_L$, energy dose E and effective exposure E* on the through-thickness modulus of the part. FIG. 2D highlights the impact of using the E, while varying $Z_L$ and E*. Notably, the scaled model highlights that using the same energy dose but different intensity and time, aka different E*, has a direct impact on the modulus profile of each layer and the modulus profile across multiple layers. This reveals that there is an additional control parameter that can be exploited in non-reciprocal materials to create functional gradients not possible with reciprocal materials where the cross-sectional modulus profile would depend only on E. Keeping energy dose constant, lower intensity leads to sharper negative mechanical gradients in layer thicknesses that are close to the cure depth Ca and leads to sharper positive gradients across layer thicknesses that are considerably smaller than the cure depth $C_d$ (FIG. 12D). Importantly, this polymerization kinetic behavior is common in most acrylate resins, so the disclosed method is applicable to a diverse set of thermosets where local stiffness scales with local conversion.

Figure 13A:
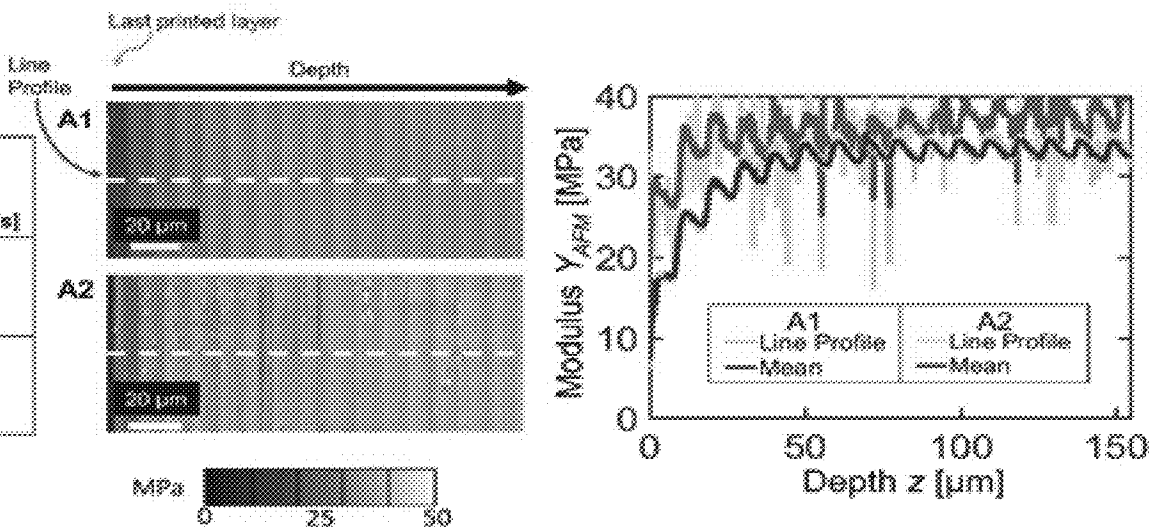
FIGS. 13A-13C depict AFM maps of through-thickness Young's modulus of 3D printed structures, demonstrating intrinsic mechanical heterogeneity that arises from the resin's sub-linear response to intensity, light absorption, repeated exposure, and species diffusion. The white dashed line indicates where the line profile was taken. The energy dose was kept constant for all samples (E=180 mJ/cm$^2$).
Figure 13B:
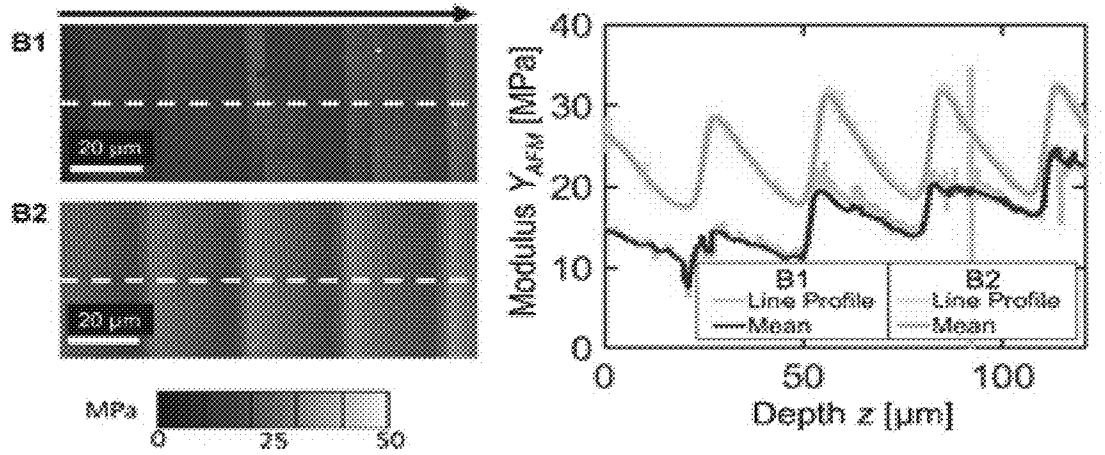
Figure 13C:
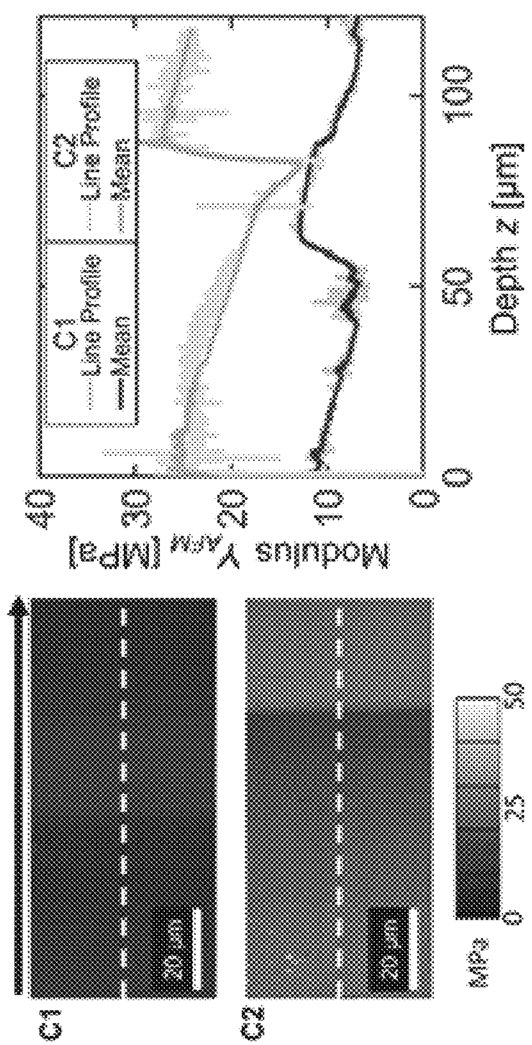

To test the efficacy of the scaled effective exposure model, structures were fabricated using the custom DLP system described in FIG. 10A, applying equivalent energy dose E, while varying layer thickness $Z_L$ between 10 μm, 30 μm, and 100 μm and varying effective exposure E* between 82 (mW $cm^{-2})^{0.77}$ s, 97 (mW $cm^{-2})^{0.77}$ s and 140 (mW $cm^{-2})^{0.77}$ s. Equivalent-dose structures with a $Z_L$=10 μm and an E*=140 (mW $cm^{-2})^{0.77}$ s consistently over-adhered to the window during printing, so E*=97 (mW $cm^{-2})^{0.77}$ s was used as the dose-equivalent condition for comparison at this smaller layer thickness. The through-thickness modulus variation in z was experimentally determined using atomic force microscopy (AFM) nanomechanical measurements on ultra-cryo-microtomed cross-sections of DLP 3D printed parts. FIGS. 13A-13C compares through-thickness AFM modulus ($Y_{AFM}$) variation in equivalent energy dose structures that were printed with different exposure times, exposure intensities, and layer thicknesses. The combined theoretical and experimental findings reveal that a higher E* leads to a steeper mechanical gradient at ≈100 μm length scales. A steeper positive gradient is achieved with higher E* and $Z_L$<<$C_d$ and a steeper negative gradient is achieved with higher E* and $Z_L$≈$C_d$. Comparison of FIGS. 12A-12D and FIGS. 13A-13C highlights that effective exposure reliably predicts final part modulus trends. For $Z_L$=10 μm and exposures E*=(82, 97) (mW $cm^{-2})^{0.77}$ s the Young's modulus averaged through the part thickness was $\overline{Y_{pred}}$=(31.4±5.2, 34.4±4.2) MPa and the average experimental AFM modulus was $\overline{Y_{AFM}}$=(31.4±4.1, 34.5±6.3) MPa. For $Z_L$=30 μm and exposures E*=(82, 140) (mW $cm^{-2})^{0.77}$ s the average predicted modulus was $\overline{Y_{pred}}$=(18.2±3.8, 26.8±4.1) MPa and the average experimental AFM modulus was $\overline{Y_{AFM}}$=(19.4±4.7, 23.8±4.3) MPa. And for $Z_L$=100 μm and exposures E+=(82, 140) (mW $cm^{-2})^{0.77}$ s the average predicted modulus was $\overline{Y_{pred}}$=(6.2±4.4, 11.0±6.6) MPa and the average experimental AFM modulus was $\overline{Y_{AFM}}$=(9.5±2.2, 22.2±3.7) MPa. Quantitative comparison between the accuracy of scaled and unscaled exposure models is described below with reference to FIGS. 14 and 15.

Figure 14:
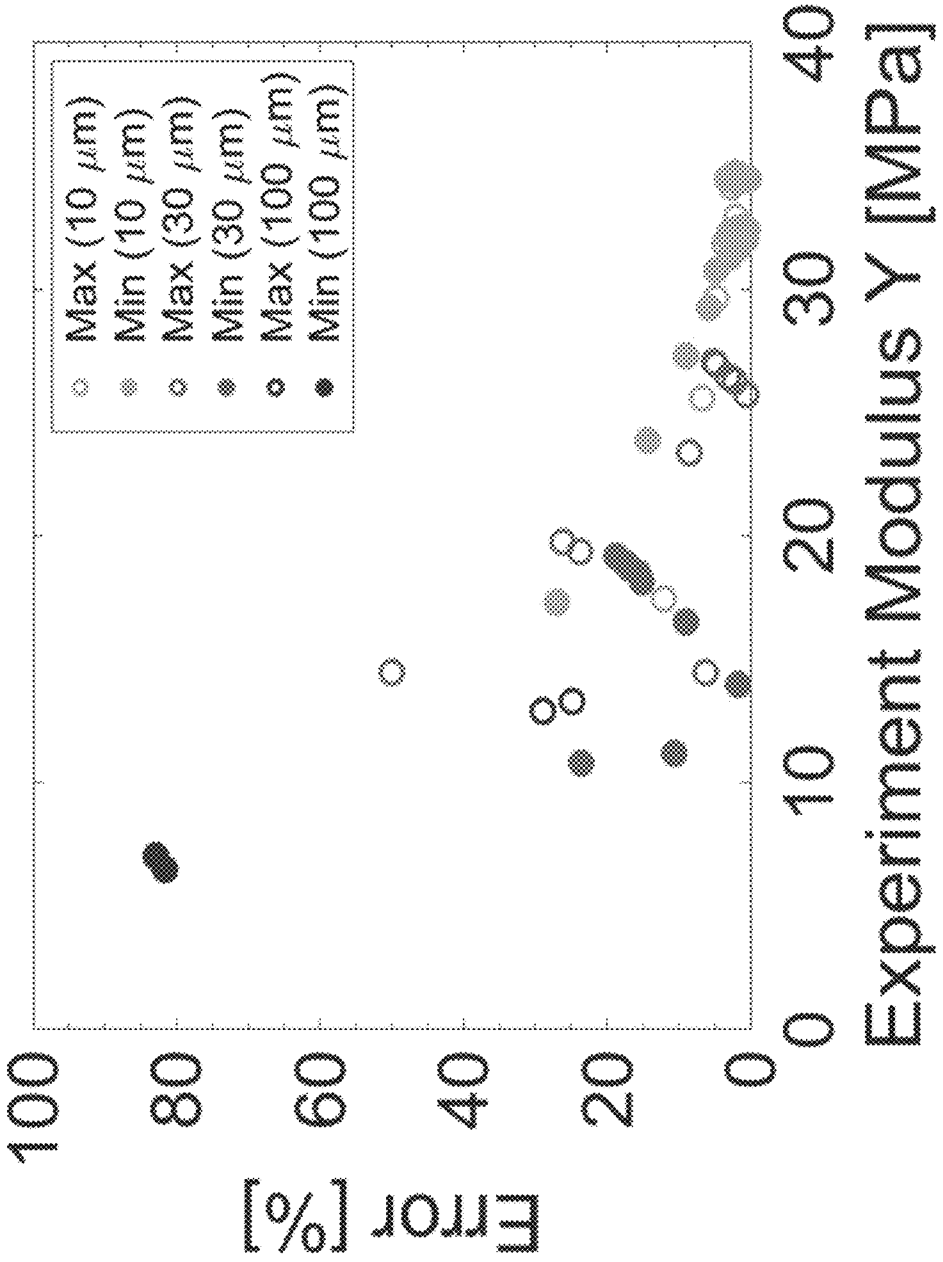
FIG. 14 depicts error expressed as a percentage of the absolute difference between modeled and experimental maximum and minimum values for each printed layer divided by the experimental values. Excellent quantitative agreement occurs in high-conversion, high-modulus regions above 20 MPa, but poor agreement occurs in lower-conversion regions below 20 MPa due to localized diffusion effects not accounted for by these bulk predictive curves. The effective exposure was kept constant for all samples (E*=82 (mWcm$^{-2}$)$^{0.77}$ s).
Figure 15:
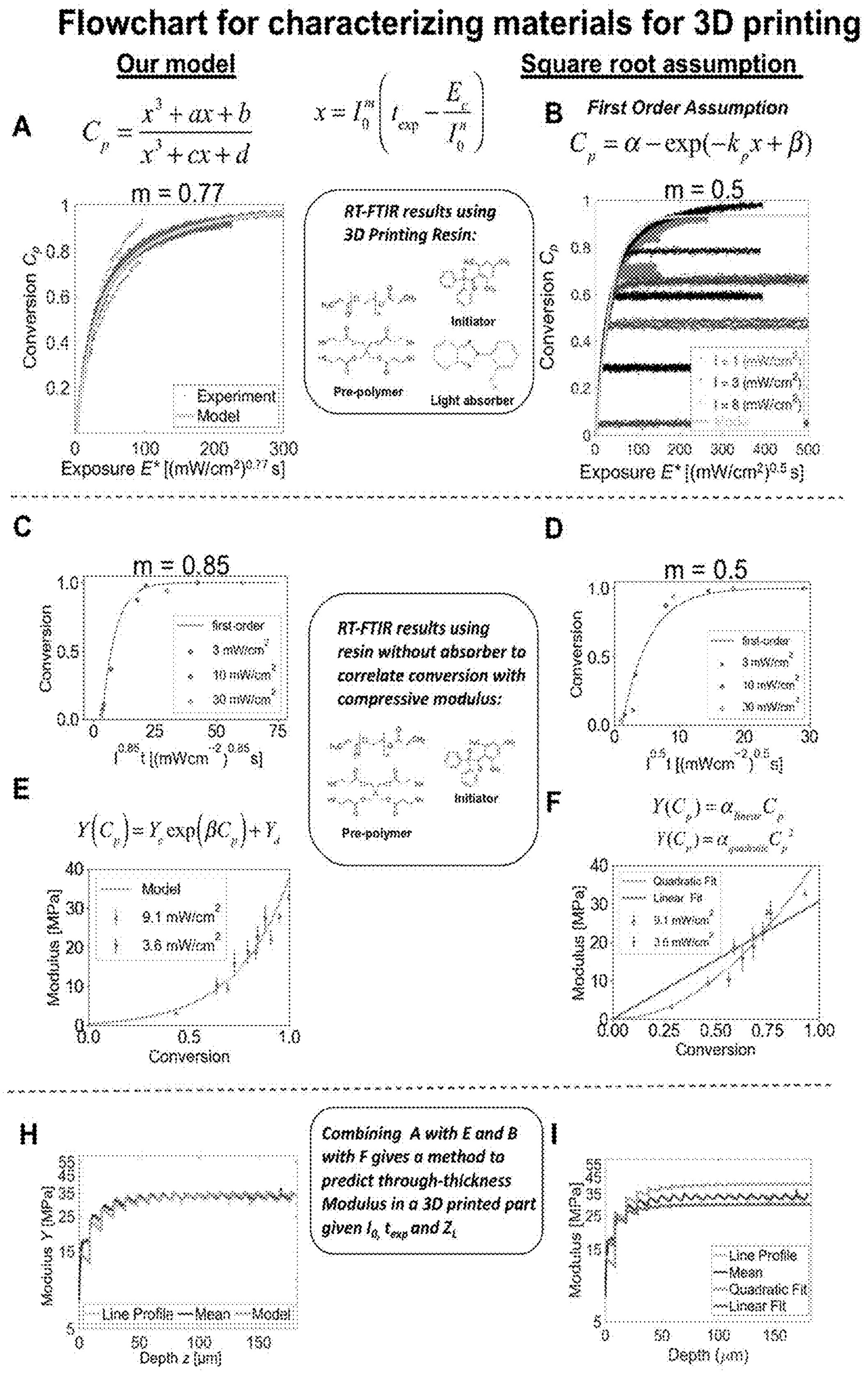
FIG. 15 depicts flowcharts of methods for describing polymerization kinetics during 3D printing to predict and control properties in depth. Panels A) and B) depict double-bond conversion as measured by RT-FTIR for the 3D printing resin. The x-axis is a scaled exposure dose $I_0^m$t, where the scaling factor m=0.77 for A) and m=0.5 for B). Monomer conversion as a function of exposure conditions can be expressed by a single predictive master curve shown in green, where A) shows an empirical model as the master curve and B) shows a first order fit derived from the steady-state approximation. Panels C) and D) depict a double-bond conversion as measured by RT-FTIR for the 3D printing resin without absorber. For both C) and D), the master curve is fit to a first-order approximation. However, they differ in that C) uses the scaling factor m=0.85 while D) uses m=0.5. Panels E) and F) depict plots of compressive Young's modulus of bulk, optically thin layers that is plotted against conversion for multiple exposure conditions, yielding a predictive curve (shown in orange). Conversion axis in E) and F) is found by the master curve in C) and D), respectively, causing the data points to differ between models. The modulus data is fit to a linear (shown in red) and a quadratic model (shown in orange) to serve as comparisons to the empirical model. Panel G) depicts a modulus map of a structure 3D printed with $Z_L$=10 μm overlayed with the model. Panel H) depicts a modulus map of a structure 3D printed with $Z_L$=10 μm overlayed with a model that assumes a square root dependence on intensity and applies both a linear and quadratic fit to the modulus data.

With reference to FIGS. 14 and 15, the model fits were compared to previously established kinetic models that use a square root intensity scaling of m=n=0.5, and thus do not account for oxygen inhibition (comparison in Panel A). The model quantitatively agrees in high-conversion and high modulus regions showing less than 15% error for moduli above 20 MPa and less than 10% error for moduli above 25 MPa. Low-conversion and low-modulus regions (below 20 MPa) show qualitative agreement (FIG. 14). Because of the need to create optically thin layers for bulk compression testing, RT-FTIR experiments were performed using 3D printing resin with and without light absorber. Notably, when the light absorber is removed, the resin undergoes significant dark polymerization, therefore affecting the polymerization kinetics described by the master curve. This causes the master curve and scaling factors used in FIG. 15, Panel A) to differ from the master curve and scaling factors used in FIG. 15, Panel C). The polymerization scaling factors used for the model were found using aforementioned methods for getting the predictive master curve. The scaling factors for the square root assumption (m=n=0.5) and the master curve fit remained constant (as shown in Panels B) and D) of FIG. 15). Panels E) and F) show compressive Young's modulus of bulk, optically thin layers plotted against conversion and compare the model to linear and quadratic fits for the data. The data in Panels G) and H) apply the relationships in the previous rows to the multi-layer case which is described by $$I_{layer}(z) = \begin{cases} I_0 \exp[-z\mu] & \text{if } z \geq 0 \\ 0 & \text{if } z < 0 \end{cases} \tag{4}$$

$$I_{total} = \sum_{i=1}^{N} I_{layer}(z - (N - i)T_z)$$

where $I_0$ is the incident exposure intensity, μ is the molar absorptivity constant of the resin, and N is the total number of layers in the print. This intensity profile is used to find the conversion $C_p$ throughout the depth of printed parts as, $$C_p(z, t_{exp}) = \frac{x^3 + ax + b}{x^3 + cx + d} \tag{5}$$

wherein $$x = I_{total}^{m}\left(t_{exp} - \frac{E_c^*}{I_{total}^{n}}\right) \tag{6}$$

To investigate the robustness of this approach, the model for modulus and conversion were compared to previously established kinetics models that use a square root intensity scaling (m=n=0.5). In every layer thickness case, the mean error of the model is lower than that of a square root assumption. These results highlight the performance of the model in high-conversion and high-modulus regions where the mean absolute error is 1.0 MPa as compared to 5.9 MPa for the square-root modulus model and 3.2 MPa for the linear modulus model when $Z_L$=10 μm (shown in Panel H)). Overall, the model outperforms other variants used in the field that assume a linear (n=m=1) or a square root (n=m=0.5) scaling of intensity to predict conversion.

The findings show that increasing effective exposure leads to increased Young's modulus throughout the part and increasing layer thickness leads to decreased modulus throughout the part (FIGS. 13A-13C). The latter is consistent with findings from Zhao et al. where the mean modulus of parts printed with $Z_L$=100 μm was higher than of those printed with $Z_L$=150 μm (Zhao, Z. et al., "Indentation experiments and simulations of nonuniformly photocross-linked polymers in 3D printed structures," Addit. Manuf., 2020, 35:101420). Although not wishing to be limited by theory, it is believed that this dependence on layer thickness is dominated by overlapping light exposures as $Z_L$ decreases, which is noted in Zhao et al. and discussed above. This effect is less pronounced in the case where $Z_L$=100 μm because the cure-depth of the material for this $I_0$ and $t_{exp}$ is $C_d$≈ 125 μm, causing minimal overlapping exposure between layers. (FIG. 3C).

Figure 16:
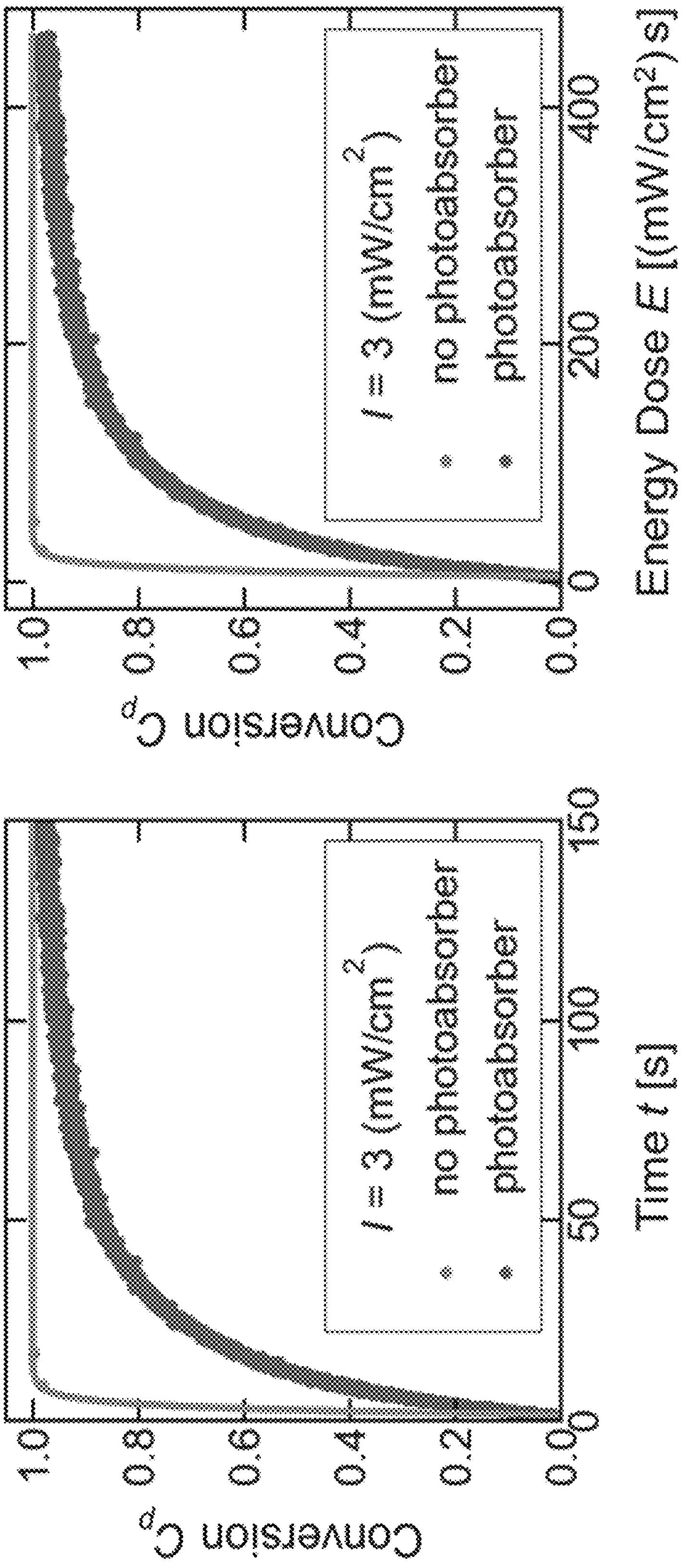
FIG. 16 depicts acrylate monomer conversion as a function of intensity and exposure time as measured by real-time Fourier Transform Infrared (RT-FTIR). Conversion as function of time and energy dose for a single intensity is shown to compare the polymerization kinetics of the resin with the presence of absorber (shown in red) and without the presence of absorber (shown in cyan). To account for the presence of light absorber, the mean of the Beer-Lambert exponential decay function was used to result in I=3 mW/cm$^2$.
Figure 17:
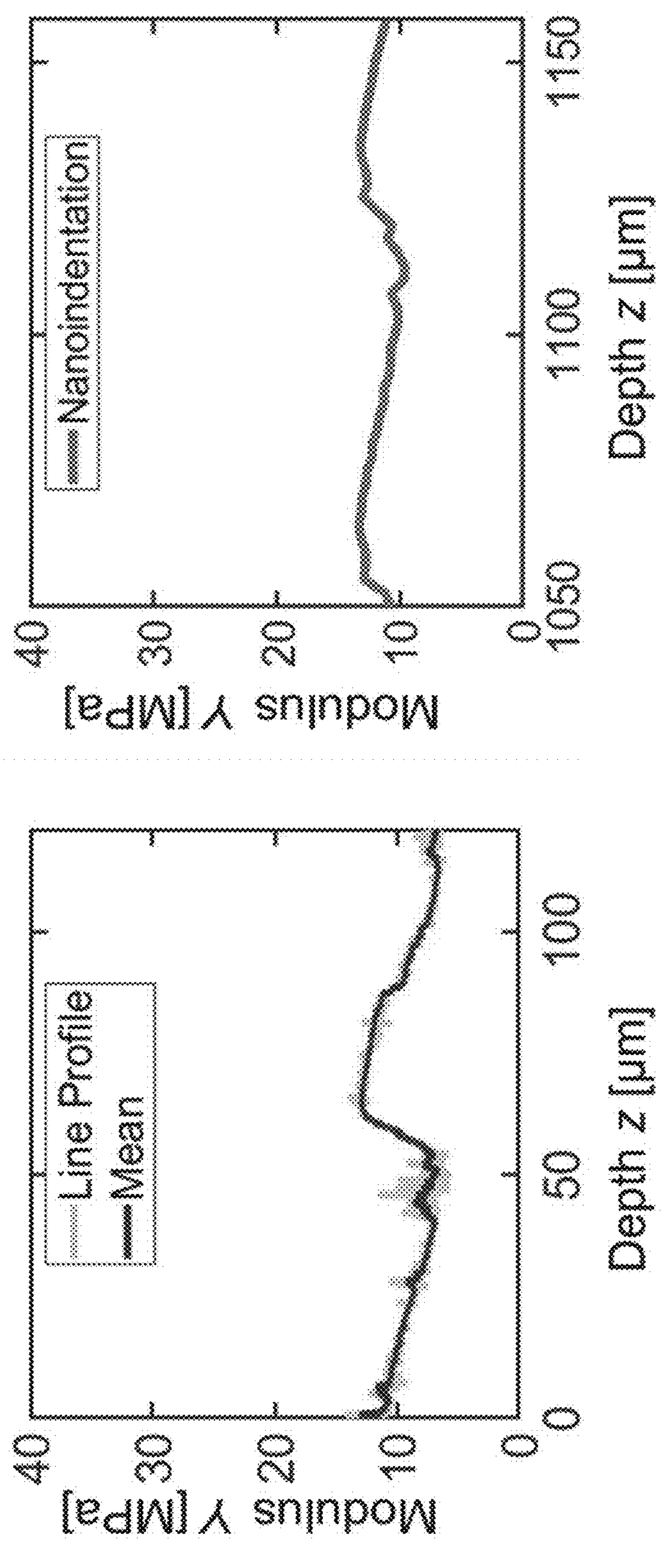
FIG. 17 depicts plots of nanoindentation (NI) (right panel) that shows agreement with AFM data of modulus Y v. depth (left panel). To further investigate the discrepancy between model and experimental modulus at low conversion, the effect of transport and overlapping exposures in a bulk part was investigated. Cylindrical structures at $Z_L$=10 μm layers with $I_0$=30 mW cm$^{-2}$ and $t_{exp}$=0.6 seconds were printed and characterized via bulk compression testing. Compressive moduli of the layered samples (26.0 MPa±2.4 MPa) closely matched the modulus determined by the AFM (26.3 MPa±2.9 MPa) for the region with the same exposure conditions.

To ensure the accuracy of experimental layer thickness and modulus values for $Z_L$=100 μm, nanoindentation (NI) was used as a complementary nanomechanical characterization tool (FIG. 16). The NI and AFM results are consistent: $Y_{NI}$ ranged from 9.6 MPa to 13.3 MPa and $Y_{AFM}$ ranged from 7.5 MPa to 13.1 MPa. In both NI and AFM results, the $Z_L$=100 μm, E*=82 (mW $cm^{-2}$) 0.77 s case shows a ≈30% shrinkage during post-processing because of the removal of unreacted monomer in the conversion gradient of the layer.

Of note, the discrepancy between $Y_{pred}$ and $Y_{AFM}$ increased at higher layer thickness. This is explained by the effect that high exposure time and low conversion has on localized diffusion of monomer and oligomers in the partially-gelled network. It has been demonstrated that mesh size can be prescribed by exposure conditions and thus conversion (Canal, T. et al., "Correlation between mesh size and equilibrium degree of swelling of polymeric networks," J. Biomed. Mater. Res., 1989, 23:1183-1193; Muralidharan, A. et al., "Stereolithographic 3D Printing for Deterministic Control over Integration in Dual-Material Composites," Adv. Mater. Technol. 2019, 4:1900592). Specifically, it has been shown that 100% conversion yielded a mesh size of ≈1.3 nm, while ≈13.5% conversion yielded a mesh size of ≈11 nm in the same acrylate-based resin used herein. Transport of monomer occurs when the hydrodynamic radius is smaller than the mesh size of the network. Estimating the monomer diffusivity D based on the diffusivity of a 1000 g/mol PEGDA molecule (D=72 $\mu m^2 s^{-1}$), the characteristic diffusion length ($\sqrt{Dt}$) is ≈19 μm for the 5 s wait time between each exposure. Therefore, diffusion occurs on a relevant length scale during the wait time between layers, a phenomenon that was not accounted for in the disclosed model but would result in a higher than predicted modulus. This finding is congruent with previous compression testing findings, where modulus increased by an order of magnitude following multiple diffusion-exposure cycles (Fiedler, C. I. et al., "Enhanced mechanical properties of photo-clickable thiol-ene PEG hydrogels through repeated photopolymerization of in-swollen macromer," Soft Matter, 2016, 12:9095-9104). It is also noted that the results herein indicate a gradient in $Y_{AFM}$ rather than a sharp change between layers predicted by the model partially due to the inhibitory effects of dissolved oxygen; this is consistent with a recent study (Gojzewski, H. et al, "Layer-by-Layer Printing of Photopolymers in 3D: How Weak is the Interface?," ACS Appl. Mater. Interfaces, 2020, 12:8908-8914). Moreover, these gradients likely serve to dissipate energy and toughen interfaces formed between layers (Birman, V. et al., "Modeling and analysis of functionally graded materials and structures," American Society of Mechanical Engineers Digital Collection, 2007, 60:195-216; Cox, L. M. et al., "Tunable Mechanical Anisotropy, Crack Guiding, and Toughness Enhancement in Two-Stage Reactive Polymer Networks," Adv. Eng. Mater., 2019, 21:1900578). The model is able to predict microscale Y(z) during printing over process conditions where transport is negligible, while predicting relative modulus change (e.g. step changes, gradients) in the presence of significant diffusion, and accounting for effective exposure.

With the predictive ability of the model established, next the model was used to inform how exposure conditions (i.e. $Z_L$, $I_0$, $t_{exp}$) can be calculated from a designed modulus profile Y(z) to exercise 3D control over fabrication of monolithic structures with programmed step functions and functional gradients in modulus. By combining Equation 1 and Equation 3, Y(z) can be programmed to create monolithic 3D printed parts with regions of low and high modulus, step functions and gradients. With the model and custom 3D printer, which allows dynamic adjustment of layer thickness and the effective exposure on each printed layer, the sharpness of the step functions and the length scale of the gradients can readily be programmed. FIG. 18 shows the dynamic exposure conditions used for FIGS. 11A-11C. The first example of patterned Young's modulus (FIG. 11A) is a structure designed to have four distinct mechanical regions; a low modulus region, a low-to-high modulus step, a high-to-low modulus gradient, and a second low modulus region. By employing the conditions in FIG. 18, the structure in FIG. 11A achieved a $Y_{AFM}$ step increase from 26 MPa to 50 MPa over just 7 μm. The 50 MPa modulus then decreased in a gradient back to 26 MPa over a 150 μm distance, after which the lower modulus was maintained. Notably, the gradient, which is longer than cure depth $C_d$, is achieved by introducing an interlayer sawtooth with decaying mean intensity to the intra-layer sawtooth defined by $C_d$. Likewise, the thin-layered sawtooth configuration is also the primary means of achieving pseudo-constant modulus value over those defined regions.

Figure 11A:
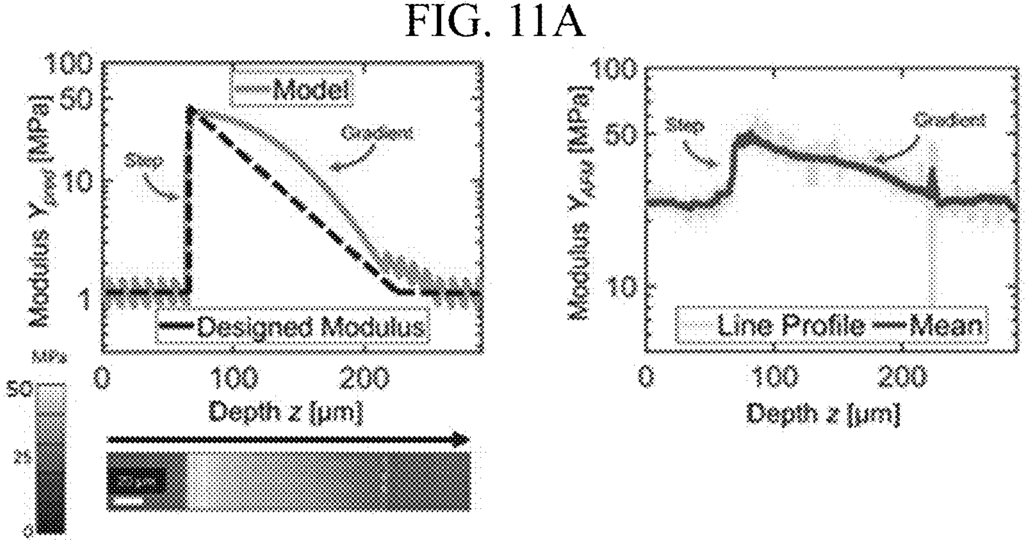
FIGS. 11A-11C depict AFM modulus maps of 3D printed monolithic structures, showing that optimal choice of exposure conditions, as informed by the disclosed scaled model, enables micron-scale through-thickness patterning of modulus. The light pink data is a line profile of the AFM modulus map ($Y_{AFM}$), the dark pink line is the mean of the AFM map for a vertical column, and the green line is the programmed modulus ($Y_{pred}$) based on the model that doesn't account for transport.
Figure 11B:
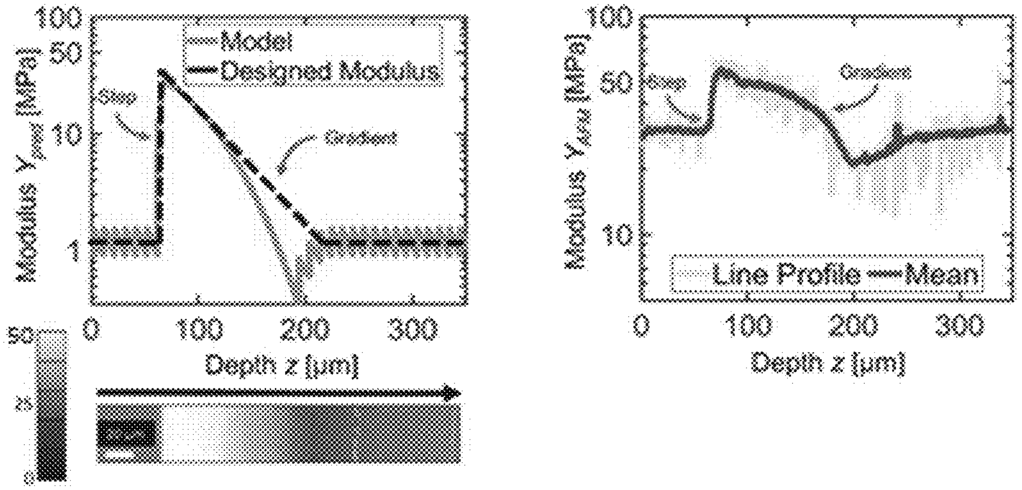

The second example (FIG. 11B) seeks to shrink the length scale of the gradient region to 100 μm, which is smaller than $C_d$ for the conditions in FIG. 11A. The gradient control is achieved by exploiting the relationship between $I_0$, $t_{exp}$, and $C_d$. To achieve the sharper gradient requires a shorter exposure time and a calculated undershooting of the target modulus. By applying the conditions in FIG. 18 for Sample 4B, this sharper gradient is experimentally realized to decrease from $Y_{AFM}$=60 MPa to $Y_{AFM}$=28 MPa over 105 μm. Although the exposure time in FIG. 11B is lower than the exposure time in FIG. 11A, a larger modulus step was achieved due to the greater influence of monomer diffusion for $Z_{L2}$=1 μm, $t_{exp2}$=2.4 s exposure where conversion is low as compared to in $Z_{L2}$=1 μm, $t_{exp2}$=6 s exposure where conversion is high.

Figure 11C:
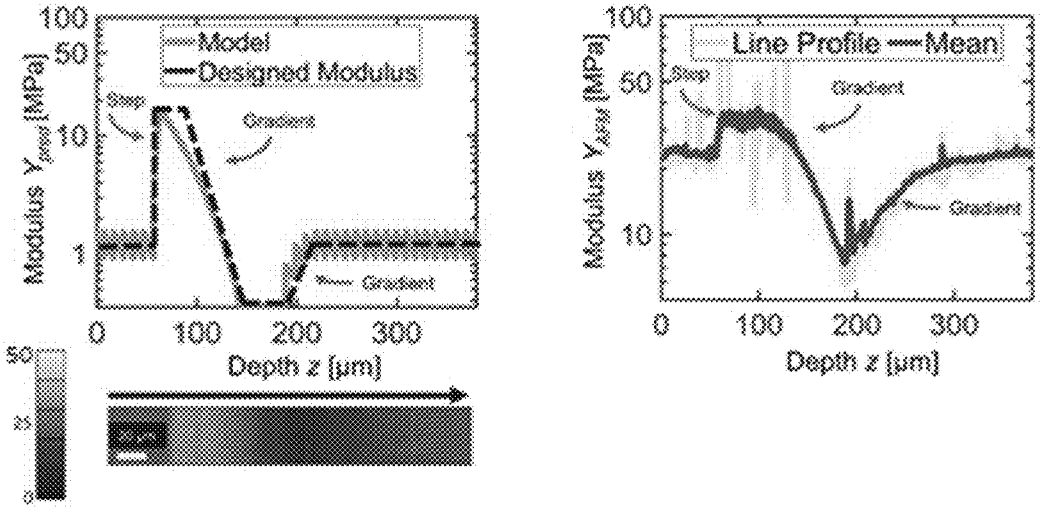

The final example of patterned modulus is a structure with three distinct constant-modulus regions and both positive and negative 75 μm gradients (FIG. 11C). The exposure pattern exhibits an intermediate modulus region, a step to high modulus region, a gradient to low modulus region, and a gradient back to intermediate modulus region. This process outlined in FIG. 18 achieved the bidirectional gradients and multiple modulus levels by further reducing exposure time to $t_{exp}2$=1.2 s for the $2^{nd}$ and $3^{rd}$ layers compared to the processing for FIG. 11B. Overall, the model shows a powerful ability to produce deliberate z-direction modulus control through straightforward process parameter variation. This method is uniquely appealing for applications that require micron-scale mechanical patterning, which is relevant to tissue engineering, graded metamaterials, and 4D printing.

In summary, described herein is a concept and process that greatly extends the capability of DLP printing for high-resolution digital manufacturing of parts with complex shapes and programmable functional gradients. Micron-scale, multidimensional control of modulus in 3D printed parts was reported through a model-informed, experimentally validated approach. Both the process simplicity and low detriment on printing speed stand in contrast with current methods for achieving high resolution 3D mechanical control which rely on multiple precursors and an ability to exchange them. The unique advantage of applying a robust computational model that uses scaled exposure ($E^*=I_0^m\ t_{exp}$) was illustrated as opposed to energy dose ($E=I_0^1\ t_{exp}$) to pattern modulus in the z-direction. The scaled exposure model reveals direct control over inter- and intra-layer gradients, which provides positive and negative mechanical gradient control, respectively. The findings complement prior works using energy dose-dependent photopolymerization kinetics and demonstrating x-y patterning, thus forming the final piece of the puzzle for 3D property control. The method described herein can be applied to any material with a well-behaved master curve (Equation 1), providing new understanding and capabilities to functional DLP printing. Future work will entail studies directed to the effect of diffusion on final part modulus as it was noted that the disclosed model illuminates the effect of transport in areas of low conversion.

The disclosures of each and every patent, patent application, and publication cited herein are hereby incorporated herein by reference in their entirety.

While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

The invention claimed is:

1. A computer-implemented method for 3-dimensional (3-D) printing of a material, the method comprising:

generating a functional relation predicting one or more physical properties of the material resulting from printing parameters, wherein the one or more physical properties of the material is selected from the group consisting of a cross link density, a swellability, a Young's modulus, a diffusivity coefficient, a shear modulus, a stiffness factor, a viscoelasticity factor, and a coefficient of friction;

algebraically or numerically inverting the functional relation to generate a second functional relation;

determining a set of printing parameters from the second functional relation; and printing the material having the one or more physical properties via a vat photopolymerization printer according to the set of determined printing parameters.

2. The computer-implemented method of claim 1, wherein the printing is further implemented according to a printing pattern on the micron scale.

3. The computer-implemented method of claim 1, wherein generating the functional relation further comprises:

measuring or calculating a physical property of the material as a function of exposure time, post-exposure time, and light intensity;

identifying an equation to model the measurements or calculations which include a number of unknown parameters; and fitting the measurements or calculations to the model to estimate values of the unknown parameters.

4. The computer-implemented method of claim 3, wherein the equation for modeling the physical property of the material comprises:

$$C_p = \frac{x^3 + ax + b}{x^3 + cx + d}$$

where a, b, c, and d are fitting parameters, and x is a variable of the exposure time, post-exposure time, and light intensity.

5. The computer-implemented method of claim 1, wherein the set of printing parameters comprises at least one of a layer thickness, an energy dose, an optical intensity, an exposure time, and a cure depth.

6. The computer-implemented method of claim 1, wherein the vat photopolymerization printer is a stereolithography (SLA) printer or a digital light processing (DLP) printer.

7. The computer-implemented method of claim 1, wherein printing the material comprises printing multiple layers of the material.

8. The computer-implemented method of claim 1, wherein the material originates from a single vat of precursor solution or resin of the printer.

9. The computer-implemented method of claim 1, wherein printing the material results in a functionally graded material (FGM).

10. A non-transitory computer-readable medium including instructions executable by a processor for printing a material, the instructions comprising:

generating a functional relation predicting one or more physical properties of the material resulting from printing parameters, wherein the one or more physical properties of the material is selected from the group consisting of a cross link density, a swellability, a Young's modulus, a diffusivity coefficient, a shear modulus, a stiffness factor, a viscoelasticity factor, and a coefficient of friction;

algebraically or numerically inverting the functional relation to generate a second functional relation;

determining a set of printing parameters from the second functional relation; and printing the material having the one or more physical properties via a vat photopolymerization printer according to the set of determined printing parameters.

11. The non-transitory computer-readable medium of claim 10, wherein the printing is further implemented according to a printing pattern on the micron scale.

12. The non-transitory computer-readable medium of claim 10, wherein generating the functional relation further comprises:

measuring or calculating a physical property of the material as a function of exposure time, post-exposure time, and light intensity;

identifying an equation to model the measurements or calculations which include a number of unknown parameters; and fitting the measurements or calculations to the model to estimate values of the unknown parameters.

* * * * *